US011875478B2

(12) United States Patent
Garg et al.

(10) Patent No.: US 11,875,478 B2
(45) Date of Patent: Jan. 16, 2024

(54) DYNAMIC IMAGE SMOOTHING BASED ON NETWORK CONDITIONS

(71) Applicant: NVIDIA Corporation, Santa Clara, CA (US)

(72) Inventors: Diksha Garg, Karnataka (IN); Keshava Prasad, Bangalore (IN); Vinayak Jayaram Pore, Maharashtra (IN); Hassane Samir Azar, Los Altos, CA (US)

(73) Assignee: NVIDIA Corporation, Santa Clara, CA (US)

( * ) Notice: Subject to any disclaimer, the term of this patent is extended or adjusted under 35 U.S.C. 154(b) by 439 days.

(21) Appl. No.: 17/005,646

(22) Filed: Aug. 28, 2020

(65) Prior Publication Data

US 2022/0067883 A1 Mar. 3, 2022

(51) Int. Cl.
G06T 5/00 (2006.01)
A63F 13/358 (2014.01)
G06T 5/20 (2006.01)
H04N 19/159 (2014.01)
H04N 19/147 (2014.01)
H04L 43/0894 (2022.01)
(Continued)

(52) U.S. Cl.
CPC ............ *G06T 5/002* (2013.01); *A63F 13/358* (2014.09); *G06T 5/20* (2013.01); *G06T 15/205* (2013.01); *H04L 43/087* (2013.01); *H04L 43/0894* (2013.01); *H04N 19/147* (2014.11); *H04N 19/159* (2014.11); *G06T 2210/36* (2013.01)

(58) Field of Classification Search
None
See application file for complete search history.

(56) References Cited

U.S. PATENT DOCUMENTS 10,460,429 B1\* 10/2019 Pinkus ...................... G06T 7/60
2014/0181271 A1\* 6/2014 Millington .............. G06F 3/167
709/219

(Continued)

OTHER PUBLICATIONS

Huang, W., et al., "Image smoothing via a scale-aware filter and L norm," IET Image Process, 2018, vol. 12, Iss. 9, pp. 1521-1528, The Institute of Engineering and Technology.
(Continued)

*Primary Examiner* — Talha M Nawaz
(74) *Attorney, Agent, or Firm* — Leydig, Voit & Mayer, Ltd.

(57) ABSTRACT

Systems and methods are disclosed for dynamically smoothing images based on network conditions to adjust a bitrate needed to transmit the images. Content in the images is smoothed to reduce the quantity of bits needed to encode each image. Filtering the images modifies regions including content having a high frequency of pixel variation, reducing the frequency, so the pixel colors in the region appear "smoothed" or homogeneous. In other words, a region of an image showing a grassy lawn has a high frequency of variation from pixel to pixel resulting from the fine detail of separate blades of grass that may be similar in color, but not homogeneous. Encoding the region as a single shade of green (or multi-pixel regions of different shades of green) enables a viewer to recognize it as a grassy lawn while greatly reducing the number of bits needed to represent the region.

22 Claims, 12 Drawing Sheets

(51) Int. Cl.
    *G06T 15/20*     (2011.01)
    *H04L 43/087*     (2022.01)

(56) References Cited

U.S. PATENT DOCUMENTS

| | | | |
|---|---|---|---|
| 2014/0189142 A1* | 7/2014 | Gouache | H04L 65/752 |
| | | | 709/231 |
| 2017/0084006 A1* | 3/2017 | Stewart | G06T 5/002 |
| 2019/0385288 A1* | 12/2019 | Stewart | G06T 5/002 |
| 2020/0134421 A1* | 4/2020 | Suthar | G06F 11/302 |
| 2021/0368095 A1* | 11/2021 | Han | G06N 3/084 |
| 2022/0337489 A1* | 10/2022 | Sawabe | H04L 41/5025 |

OTHER PUBLICATIONS

Nakagawa, A., et al., "Dynamic Resolution Conversion Method for Low Bit Rate Video Transmission," (2001), pp. 930-940.

\* cited by examiner

DYNAMIC IMAGE SMOOTHING BASED ON NETWORK CONDITIONS

BACKGROUND

Cloud gaming services provide clients access to games hosted on servers by performing many of the processing tasks in the servers, and streaming the processing results (e.g., graphical output) to a local client device. The quality of streaming depends on network conditions, such as available channel bandwidth. When the bandwidth is low, users experience blurriness and blocky artifacts in frames and sometimes even loss of frames causing stutters. Conventionally, in order to improve the end user experience, Dynamic Resolution Conversion (DRC) is used to reduce the frame resolution whenever bandwidth is low and to transmit lower resolution frames to the client where the frames are then upscaled. A problem with DRC is that each time the resolution is changed, both the encoder and decoder must be reset. Also, after the reset, the encoder transmits an IDR (Instantaneous Decoder Refresh) coded picture—a particular type of I-frame—to clear the contents of the reference picture buffer in the decoder and prevent use of any previous frames as a reference frame. The first frame transmitted at the new resolution is encoded as an IDR frame, causing a surge in bitrate even when the resolution is being reduced. Reinitialization for the decoder to use the new IDR frame may cause jitter in the frame rate. There is a need for addressing these issues and/or other issues associated with the prior art.

SUMMARY

Embodiments of the present disclosure relate to dynamically filtering images based on network conditions. Systems and methods are disclosed that dynamically adjust the bitrate needed to transmit images by smoothing high spatial frequency content based on the network conditions. In contrast to conventional systems, such as those described above, the pixel resolution of the images is not necessarily changed to adapt to the network conditions. Instead, regions and/or content in the images is smoothed to reduce the amount of bits needed to encode each image. Filtering the images modifies regions including content having a high frequency of pixel variation, reducing the frequency so the pixel colors in the region appear "smoothed." For example, a region of an image showing a grassy lawn may have a high frequency of variation from pixel to pixel resulting from the fine detail of separate blades of grass that may be similar in color. Encoding the region as a single shade of green (or multi-pixel regions of different shades of green) enables a viewer to recognize it as a grassy lawn while greatly reducing the number of bits needed to represent the region and the bitrate needed to transmit the encoded image.

BRIEF DESCRIPTION OF THE DRAWINGS

The present systems and methods for dynamic image smoothing based on network conditions are described in detail below with reference to the attached drawing figures, wherein.

DETAILED DESCRIPTION

Systems and methods are disclosed related to dynamically smoothing images based on network conditions. Image smoothing may be applied to reduce the number of bits needed to encode images. Small scale details, such as texture content in an image, are smoothed by filtering high spatial frequency content within the image. In the context of the following description, the smoothing reduces entropy within the images which changes the values of pixels and enables more efficient encoding of the smoothed images. When the network conditions improve, the filtering can be adjusted to reduce smoothing and increase the bitrate.

The amount of smoothing that is used can be dynamically tuned based on the network conditions to provide clients accessing applications on servers an interactive experience with visually meaningful images. In particular, even as the amount of smoothing increases, important image details such as object edges and structure are preserved. Dynamic smoothing quickly responds to changes in the network conditions and does not require resetting the encoder and/or decoder. Perceptually important features remain visible, so the end user experience is improved compared with using conventional techniques that reduce the image resolution and/or jitter the frame rate.

Figure 1A:
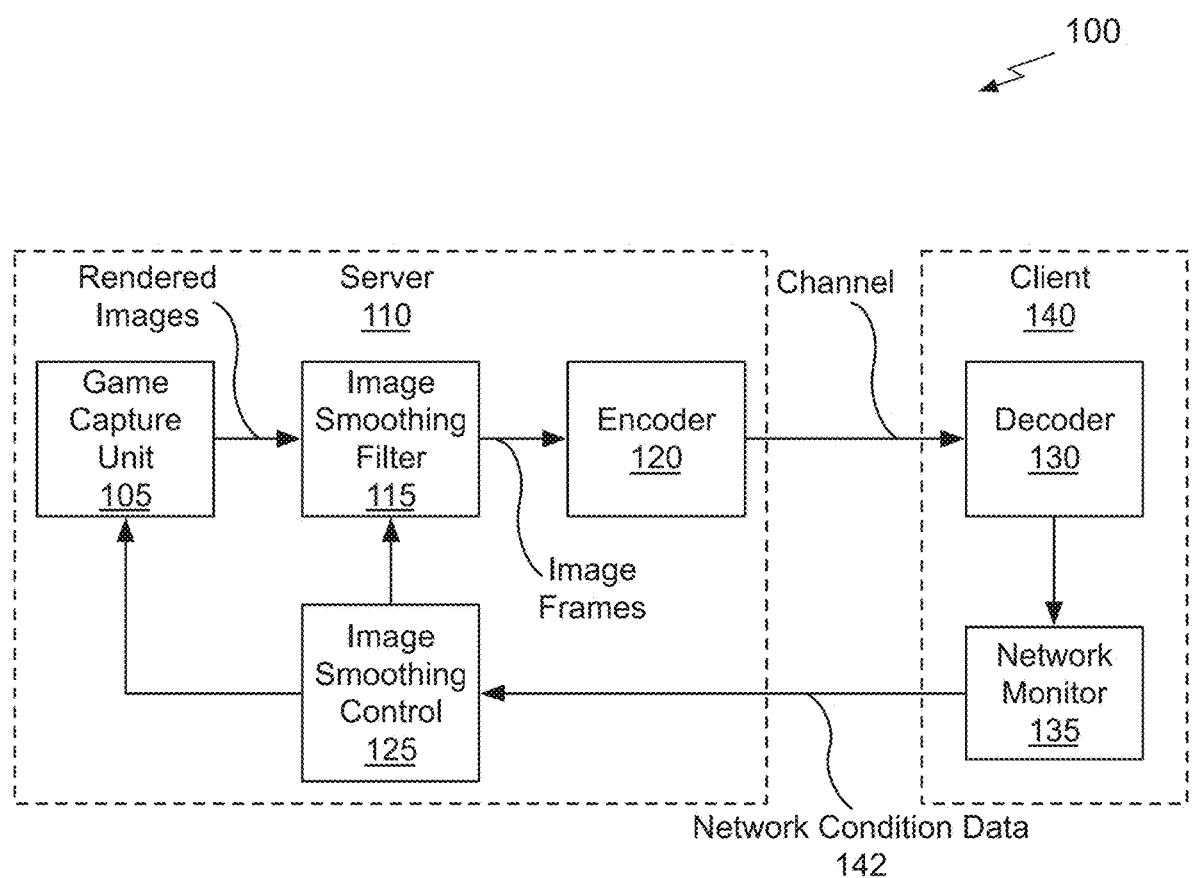
FIG. 1A illustrates a block diagram of an example server/client system suitable for use in implementing some embodiments of the present disclosure.

FIG. 1A illustrates a block diagram of an example server/client system 100 suitable for use in implementing some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether.

Further, many of the elements described herein are functional entities that may be implemented as discrete or distributed components or in conjunction with other components, and in any suitable combination and location. Various functions described herein as being performed by entities may be carried out by hardware, firmware, and/or software, or any combination thereof. For instance, various functions may be carried out by a processor executing instructions stored in memory. Furthermore, persons of ordinary skill in the art will understand that any system that performs the operations of the server/client system 100 is within the scope and spirit of embodiments of the present disclosure.

As shown in FIG. 1A, the server 110 transfers encoded data via a channel to a client 140. Although the server/client system 100 is described in the context of transferring image data, in some embodiments other types of data (encoded or not), such as side information depth buffers, normals, and the like, may be dynamically smoothed and transferred.

The client 140 provides network condition data 142 to the server 110. In another embodiment, the network monitor 135 or an additional network monitor 135 is configured within the server 110 to provide the network condition data 142. Network condition data 142 may include data relating to available bandwidth, latency, jitter, and packet loss for the channel. Based on the network condition data 142, image smoothing control 125 generates parameters to dynamically control filtering of high spatial frequency content by an image smoothing filter 115 and/or a game capture unit 105. In an embodiment, the image smoothing control 125 adjusts the parameters when predetermined threshold values of the network condition data 142 are crossed. In an embodiment, the image smoothing control 125 increases the amount of smoothing when the network condition data indicates the channel capacity is exceeded and decreases the amount of smoothing when the channel capacity is not exceeded.

In order to dynamically adjust the bitrate, image smoothing is performed at the server 110 before the frames are encoded for transmission to the client 140. Image smoothing is accomplished by filtering high spatial frequency content within the image. Image smoothing may be applied by the game capture unit 105 during image rendering or may be applied to the rendered images by the image smoothing filter 115. In general, the image smoothing is performed before the image frames are encoded. The game capture unit 105 generates the rendered images and may include a game engine that renders at least a portion of the rendered images according to at least one parameter received from the image smoothing control 125.

In an embodiment, the parameters include a texture LOD (level of detail) bias that controls the resolution of the texture map that is applied to surfaces during rendering. For example, a texture map may be applied to a surface of a character, scene background, terrain, building or structure, and the like. A texture map is filtered to generate each lower resolution LOD to produce a set of texture maps (e.g., mipmap) corresponding to different LODs. Biasing the LOD calculation to use a lower resolution of the texture map decreases image quality and typically improves rendering speed due to improved texture data caching. Decreases in image quality caused by using a lower resolution texture map appear as a blurred artifact in the rendered image. Conventionally, the texture map LOD may be biased to maintain a minimum frame rate for real time rendering. Biasing the LOD is a first filtering mechanism that may be used to generate a smoothed image. A second filtering mechanism that may be used instead of or in addition to the first is to apply a filter to the rendered image.

The rendered images output by the game capture 105 may be filtered by the image smoothing filter 115 according to one or more parameters received from the image smoothing control 125. Generally, the image smoothing filter 115 implements filters that process the pixels to blur small scale details while preserving structural edges of geometry within the rendered image frames to produce smoothed image frames. In an embodiment, the image smoothing filter 115 implements a rolling guidance filter, which may include a bilateral filter and/or a domain transform filter.

In an embodiment, the image smoothing control 125 also receives user defined controls that are used to determine the parameters. The user defined controls may specify the type of filtering that is performed by the image smoothing filter 115 and/or a game capture unit 105. For example, an edge-preserving smoothing filter function may be selected or defined for the image smoothing filter 115. In an embodiment, a minimum and/or maximum level of smoothing (or LOD bias) may be specified by the user defined controls.

The encoder 120 encodes (compresses) the smoothed image frames, producing encoded image frames for transmission to the client 140. A decoder 130 decodes (decompresses) the encoded image frames to generate the smoothed image frames at the client 140. The network monitor 135 detects changes in the network conditions and provides updates to the image smoothing control 125. In an embodiment, the network monitor 135 continuously or periodically provides the network condition data 142 to the image smoothing control 125

Image smoothing is compatible with existing encoders and decoders in conventional server/client systems. In contrast with DRC, image smoothing does not require resetting either the encoder 120 or the decoder 130 when the amount of smoothing changes. The basic idea behind image smoothing is that an image consists of thousands of pixels, but not all the pixels are of equal importance. As per a HVS (Human visual system) model, only the overall structural features are of high importance for human perception and the individual details, such as the high frequency details (e.g., textures and artifacts), are not important. Therefore, image smoothing extracts meaningful information from an image. Structural details in the image, such as edges and corners of geometric objects and text are preserved and complex details like textures and small detail patterns are removed. For example, texture applied to the sky or ground may be smoothed to a constant color while branches of a tree (small primitives) and edges of a road are retained. Importantly, text remains sharp when the image smoothing is applied to reduce the bitrate. In contrast, text appears blurry when DRC is used to reduce the bitrate.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

Figure 1B:
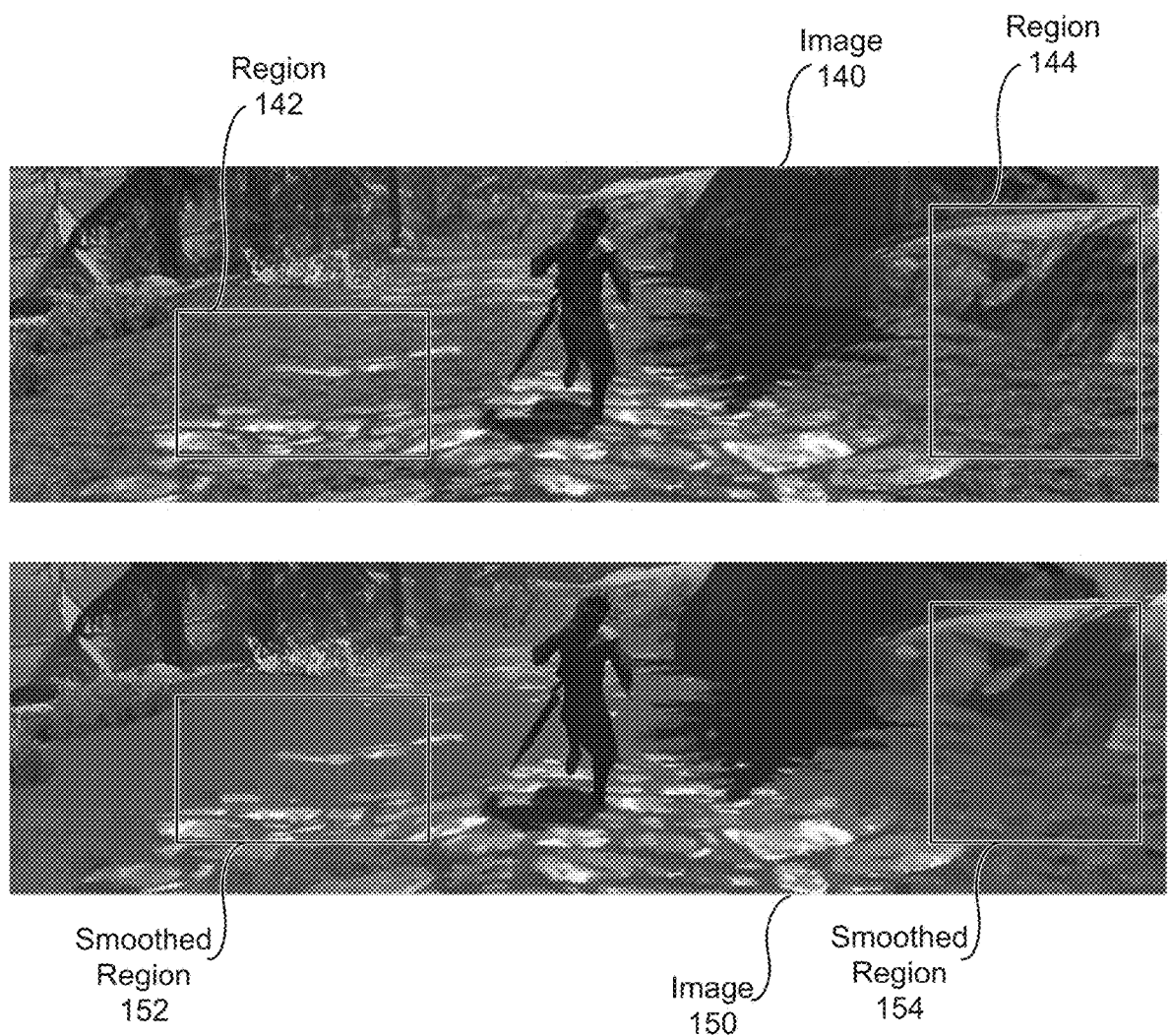
FIG. 1B illustrates an image and a version of the image that is smoothed, in accordance with an embodiment.

FIG. 1B illustrates an image 140 and a version of the image that is smoothed, image 150, in accordance with an embodiment. The image smoothing filter 115 processes the image 140 to produce the image 150. The image 140 is rendered without any modification of the LOD bias values used for texture mapping. In other embodiments, the image 140 may be rendered with modified LOD bias values. As depicted in FIG. 1B, certain high frequency details of the content within region 142 are reduced in smoothed region 152. Specifically, pixels having similar colors that vary pixel-to-pixel are shaded with a single color. Edges of the bright patches of the content within region 142 are preserved within smoothed region 152 while the darker area appears homogeneous. Similarly, high frequency details of the content within region 144 appear homogeneous in smoothed region 154. In contrast, the silhouette of the character and shadow of the tree remain sharp in the smoothed image 150 compared with the image 140. The smooth filtered image 150 retains the significant details and structure, enabling gameplay to continue without reducing the image resolution or jittering the frame rate. In some embodiments, bitrate savings of 20-35% are achieved using the image smoothing filter 115. When LOD bias values are modified, the bitrate savings may be as high as 75% (e.g., a 4× bitrate reduction).

In general, compared with DRC, images that are dynamically smoothed via filtering are sharper. Small text is blurred when DRC is used due to the downscaling and upscaling process, whereas sharpness is preserved for the smoothed images. For some smoothed images, object edges are sharper even when compared with the original image and smoothing may also remove noise around the object edges. Furthermore, for some image sequences, blocky artifacts are reduced in the smoothed version of the image sequence compared with the original image sequence.

Figure 1C:
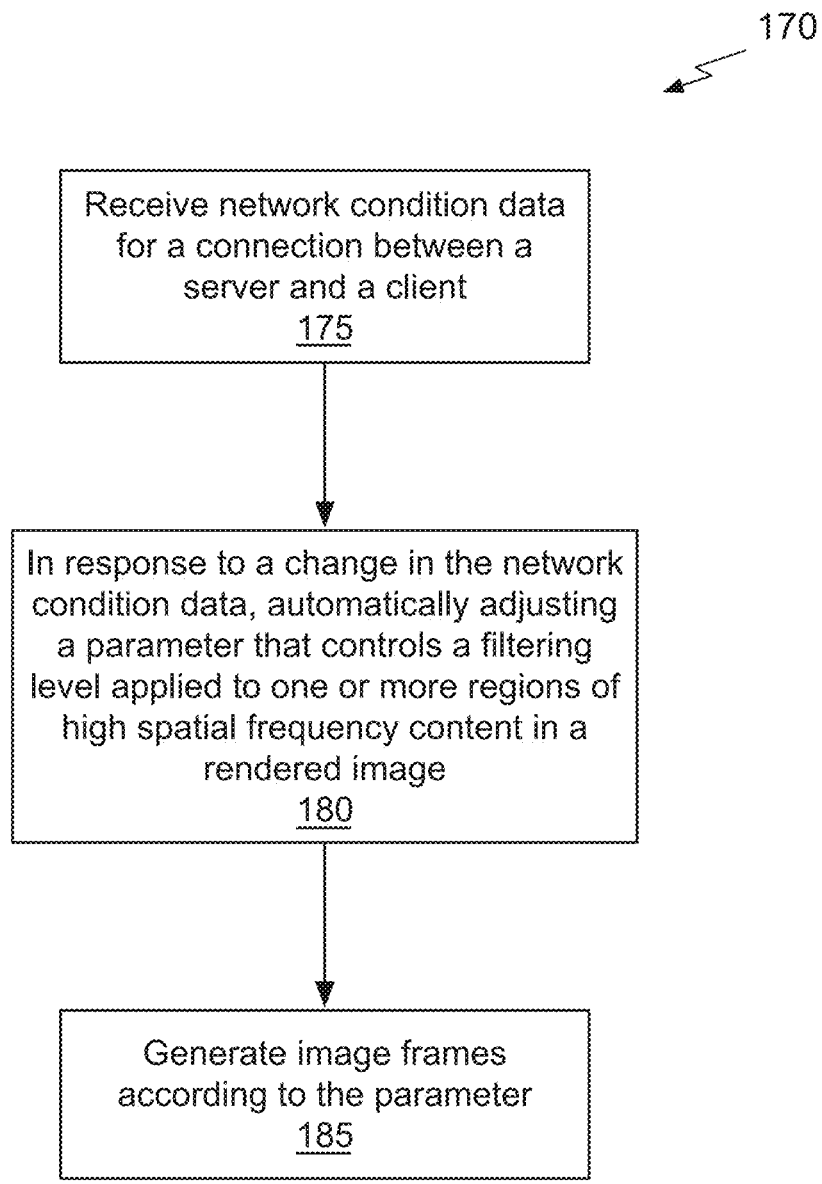
FIG. 1C illustrates a flowchart of a method for performing dynamic image smoothing, in accordance with an embodiment.

FIG. 1C illustrates a flowchart of a method 170 for performing dynamic image smoothing, in accordance with an embodiment. Each block of method 170, described herein, comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few. In addition, method 170 is described, by way of example, with respect to the system of FIG. 1A. However, this method may additionally or alternatively be executed by any one system, or any combination of systems, including, but not limited to, those described herein. Furthermore, persons of ordinary skill in the art will understand that any system that performs method 170 is within the scope and spirit of embodiments of the present disclosure.

At step 175, network condition data 142 is received for a connection between the server 110 and the client 140. In an embodiment, the image smoothing control 125 receives the network condition data 142. The network condition data may include data related to or representative of one or more of available bandwidth, latency, jitter, and packet loss for the connection.

At step 180, in response to a change in the network condition data, a parameter that controls filtering of high spatial frequency content is adjusted. In an embodiment, when the network condition data 142 indicates that the quality of the connection has decreased, the amount of smoothing implemented by the filtering is increased. In an embodiment, the network condition data 142 is evaluated according to one or more predetermined threshold values associated with quality-of-service (QoS) metrics. In an embodiment, when the network condition data 142 indicates that the quality of the connection has increased, the amount of smoothing implemented by the filtering is decreased.

At step 185, image frames are generated according to the parameter. In an embodiment, the parameter corresponds to an LOD bias and the rendered images are rendered using the LOD bias to reduce entropy of the textured surfaces. In another embodiment, the parameter corresponds to a smoothing filter and the rendered images are filtered according to the parameter to reduce high frequency spatial variations in the pixels. The image smoothing control 125 may produce one or more parameters to control the LOD bias and/or the filtering for each rendered image.

Figure 2A:
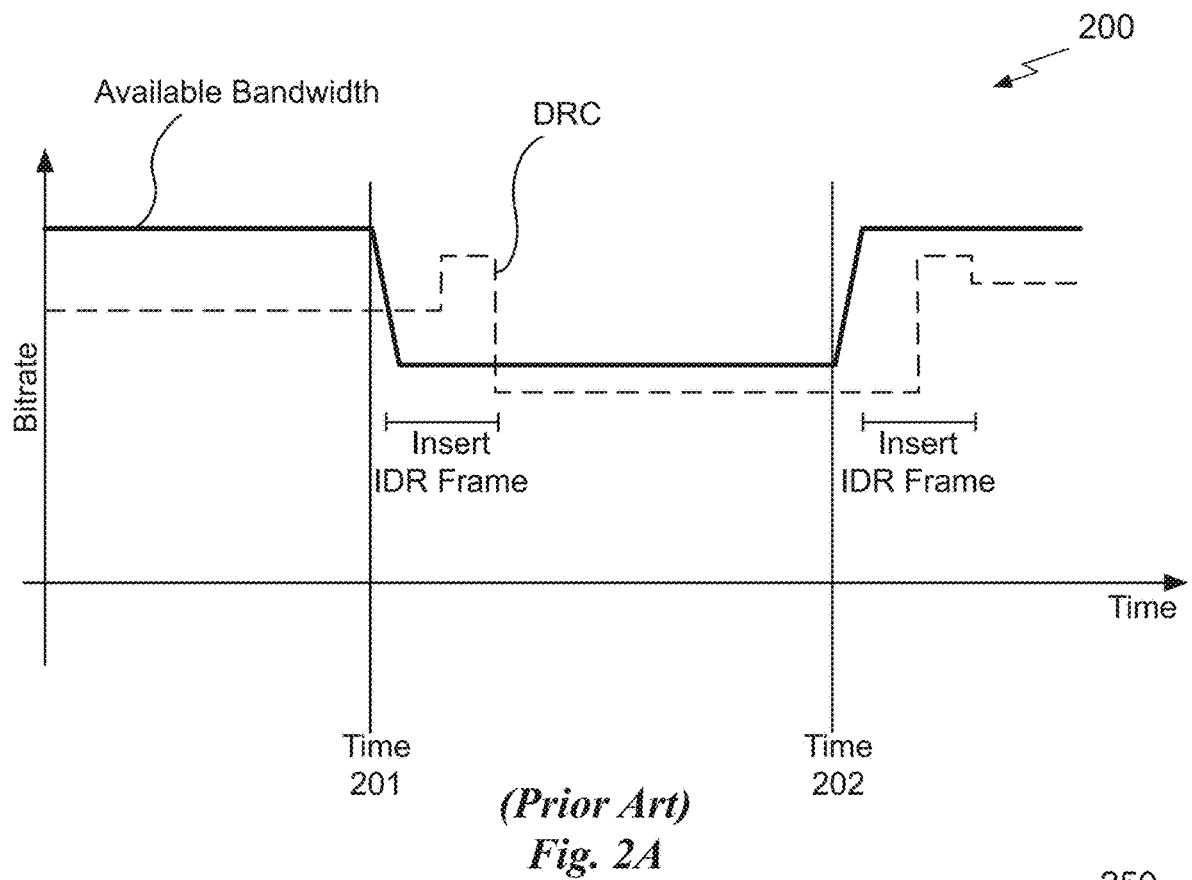
FIG. 2A illustrates a graph of DRC for bitrate reduction in accordance with the prior art.

FIG. 2A illustrates a graph 200 illustrating DRC for bitrate reduction in accordance with the prior art. The graph 200 illustrates the available bandwidth of the connection from the server to the client over time. The graph 200 also illustrates changes in the bitrate that is consumed for the dynamic smoothing technique and DRC. At time 201 the available bandwidth of the connection from the server to the client decreases from a first level to a second level. In response, a conventional DRC system reduces the image resolution, increasing the bitrate during insertion of a lower resolution I frame. The encoder and decoder are reset to change the resolution for DRC.

Transmission of the IDR frame after time 201 causes a spike in the bitrate, after which the bit rate of DRC drops to a level below the available bandwidth. The spike in bitrate may be particularly problematic because the available bandwidth is already reduced. Furthermore, the client may be unable to maintain a constant frame rate, resulting in frame jitter that is visible to the end user. When the available bandwidth increases from the second level back to the first level at time 202, conventional DRC increases the image resolution. Changing the resolution requires resetting the encoder and decoder and transmitting another IDR frame after time 202. For DRC, the bitrate spikes again during transmission of the second IDR frame and then adjusts to a steady bitrate. Resetting the decoder and/or the spike in bitrate may cause a frame jitter even when the available bandwidth increases.

In contrast with DRC, the dynamic smoothing technique does not require resetting the encoder and/or decoder and does not cause a spike in bitrate or frame jitter. Furthermore, the dynamic smoothing technique may continuously adapt the filtering to the available bandwidth. Due to variations in each image, it is difficult to determine the amount of change in bitrate a particular adjustment of the parameter will cause. Therefore, in an embodiment, the adjusted parameter may reduce or increase the bitrate by a greater or lesser amount, respectively, than is needed to not surpass the available bandwidth. In other words, the adjustments to the parameter may be conservative in response to a change in the network condition data 142 and then fine-tuned or optimized. The parameter may be adjusted continuously when the bitrate, measured by the server 110 at the encoder 120 is not within a threshold range of the available bandwidth.

Figure 2B:
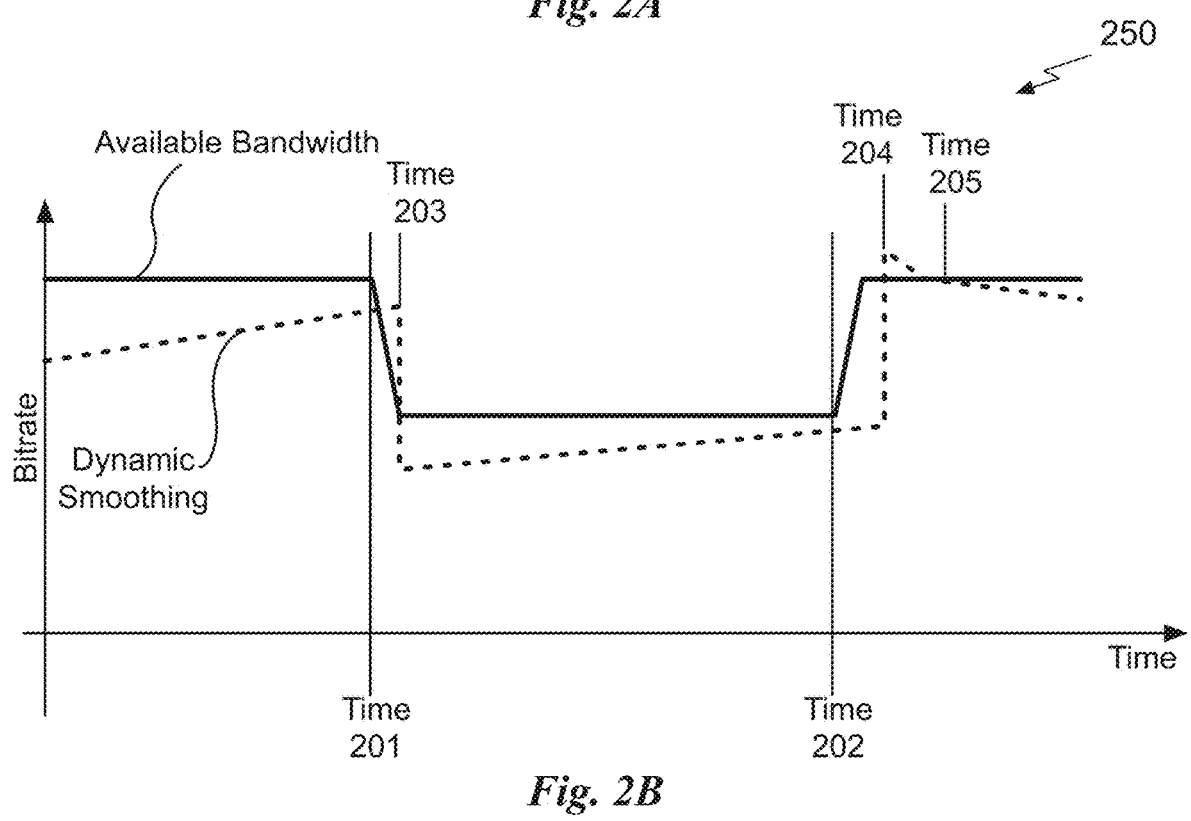
FIG. 2B illustrates a graph of dynamic image smoothing for bitrate reduction in accordance with some embodiments of the present disclosure.

FIG. 2B illustrates a graph 250 illustrating dynamic image smoothing for bitrate reduction in accordance with some embodiments of the present disclosure. As shown in the graph 250, the dynamic smoothing bitrate may increase from the start time, increasing to approach the level of the available bandwidth at time 203, shortly after the available bandwidth is reduced at time 201. Adjusting the parameter to increase the level of smoothing quickly reduces the bitrate for transmitting the dynamically smoothed images. The image smoothing control 125 may continue to adjust the parameter after time 203 based on the measured bitrate and the network condition data 142 so that the bitrate increases while still remaining below the available bandwidth. In another embodiment, the parameter is constant until the available bandwidth changes by more than a predetermined value. The image smoothing control 125 may delay increasing the bitrate (decreasing the level of smoothing) to ensure that the increased available bandwidth is consistent. Similarly, the image smoothing control 125 may delay decreasing the bitrate (increasing the level of smoothing) when the available bandwidth decreases. Different delays may be used by the image smoothing control 125 for adjusting the parameter to increase or decrease the bitrate. In an embodiment, a shorter delay is used to decrease the bitrate and a longer delay is used to increase the bitrate. The delays may be predetermined, programmed, or computed based on the network condition data 142.

As shown in the graph 250, at time 202 the available bandwidth increases. In response, at time 204, the image smoothing control 125 adjusts the parameter to decrease the level of smoothing and the bitrate for transmitting the encoded image frames increases. The increased bitrate at time 204 is higher than the available bandwidth, so the image smoothing control 125 adjusts the parameter to increase the smoothing, reducing the bitrate to an amount that is lower than the available bandwidth at time 205. The image smoothing control 125 may continue to adjust the parameter after time 205 to fine-tune the bitrate.

In contrast with the conventional DRC technique, image smoothing does not require resetting the encoder and/or decoder to insert an IDR frame. Instead, at least one of the encoded image frames that is transmitted before the parameter is adjusted may be used as an I frame by the decoder to decode encoded image frames that are received after the parameter is adjusted. When resets and/or spikes in the bitrate are avoided, the frame rate of the decoded image frames is constant before and after the parameter is adjusted.

Figure 2C:
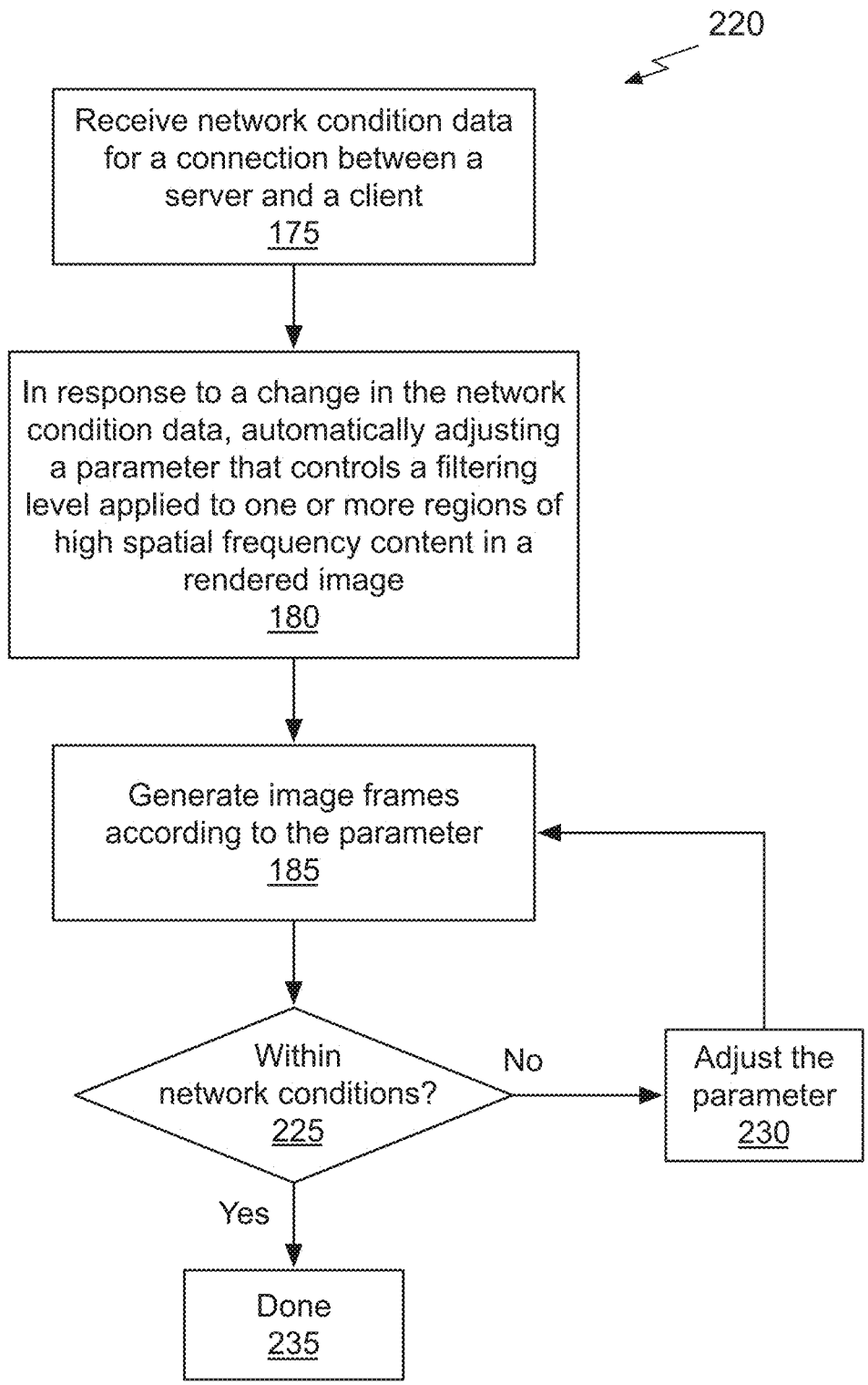
FIG. 2C illustrates a flowchart of another method for performing dynamic image smoothing, in accordance with an embodiment.

FIG. 2C illustrates a flowchart of another method 220 for performing dynamic image smoothing, in accordance with an embodiment. The method 220 includes steps 175, 180, and 185 of the method 170. Steps 175, 180, and 185 are performed as previously described. At step 225, the image smoothing control 125 determines if the transmissions from the server 110 to the client 140 are within a range of threshold values for network conditions (e.g., as determined by one or more QoS metrics). For example, if the bitrate of the transmissions is greater than the available bandwidth indicated by the network condition data 142 then the transmissions are not within the range of threshold values. If the bitrate of the transmission is equal or less than the available bandwidth then the transmissions are within the range of threshold values.

If, at step 225, the image smoothing control 125 determines that the transmissions are not within the range of threshold values, then at step 230 the image smoothing control 125 adjusts the parameter before returning to step 185. The image smoothing control 125 may adjust one or more parameters to control the filtering via the LOD bias and/or the image smoothing for each rendered image.

If, at step 225, the image smoothing control 125 determines that the transmissions are within the network conditions, then at step 235 the image smoothing control 125 holds the parameter constant until the network condition data 142 changes. In an embodiment, the image smoothing control 125 holds the parameter constant until the network condition data 142 and/or the transmission bitrate changes.

As previously described, the LOD bias used to render the images may be controlled by the image smoothing control 125 to adjust the bitrate of the encoded image frames. In some embodiments, the LOD bias is not exposed or accessible outside of the application program that running on the game capture unit 105. When control of the LOD bias is not exposed, the image smoothing control 125 may be unable to set a value for the LOD bias for use during rendering.

Figure 3A:
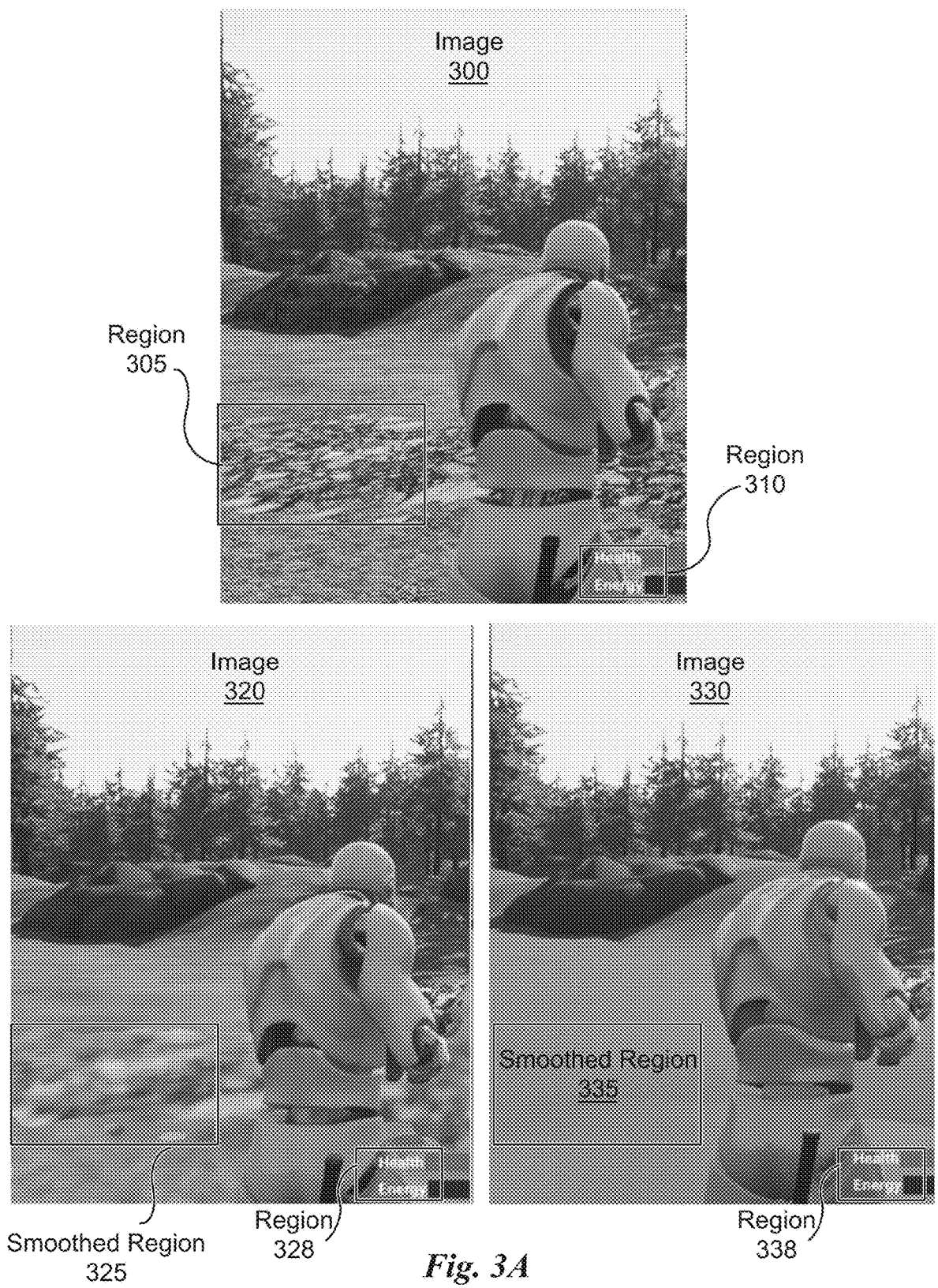
FIG. 3A illustrates an image and two versions of the image that are smoothed, in accordance with an embodiment.

FIG. 3A illustrates an image 300 and two versions of the image that are smoothed, in accordance with an embodiment. The game capture unit 105 renders the image 300 without modifying the texture LOD values using the parameter provided by the image smoothing control 125. The game capture unit 105 may apply an LOD bias that is not based on the parameter and is instead determined by the game program itself without knowledge of the network condition data 142. In an embodiment, the parameter provided by the image smoothing control 125 has a higher priority compared with the LOD bias determined by the game program and overrides the LOD bias (if any) determined by the game program.

Image 320 is rendered by the game capture unit 105 with a first LOD bias value controlled by the image smoothing control 125. Image 330 is rendered by the game capture unit 105 with a second LOD bias value controlled by the image smoothing control 125. A smoothing filter is not applied to the image 300 to produce the images 320 and 330. The first LOD bias value may reduce the highest texture map resolution from 256×256 to 64×64 and each lower resolution mipmap is similarly biased down by four in each dimension. The second LOD bias value may reduce the highest texture map resolution from 256×256 to 8×8 and each lower resolution mipmap is similarly biased down by 32 in each dimension. In an embodiment, the image smoothing control 125 adjusts the parameter to control the LOD bias value to predetermined values according to ranges of the available bandwidth to control the smoothing. In an embodiment, the game capture unit 105 supports mipmap LOD bias values from 0 to 15 for 16 different levels of texture LOD.

In one or more embodiments, and as depicted in FIG. 3A, the high spatial frequency details within region 305 are reduced in smoothed region 325 and are even more reduced in smooth region 335 which appears homogeneous. In contrast, regions that do not include texture mapped surfaces are not affected by the LOD bias adjustment. For example, the trees on the horizon are constructed as primitives (typically small triangles), so the structure of the trees appears preserved in images 320 and 330. Similarly, the structure and appearance of the character is preserved in images 320 and 330. The text within region 310 is preserved within smoothed regions 328 and 338. Similarly, text, symbols, and icons within a heads-up-display (HUD) will be preserved.

The smoothed images 320 and 330 retain the significant details and structure very well, enabling gameplay to continue without reducing the image resolution or jittering the frame rate. The bitrate savings using the LOD bias adjustment for the smoothed images 320 and 330 is 58% and 62%, respectively. In an embodiment, the image smoothing filter 115 may be configured to apply a filter to images that have been rendered using an LOD bias value provided by the image smoothing control 125. In such an embodiment, the image smoothing control 125 may provide a first parameter to control the LOD bias and a second parameter to control the smoothing filter.

Although the smoothing technique is described in the context of rendered images, the technique may also be applied to other images, such as images captured "in the wild." However, for images that are not rendered, the LOD bias values may not be used to perform smoothing. Furthermore, when the game capture unit 105 does not support modification or control of the LOD bias for texture mapping, a parameter that modifies the LOD bias has no impact for smoothing.

Figure 3B:
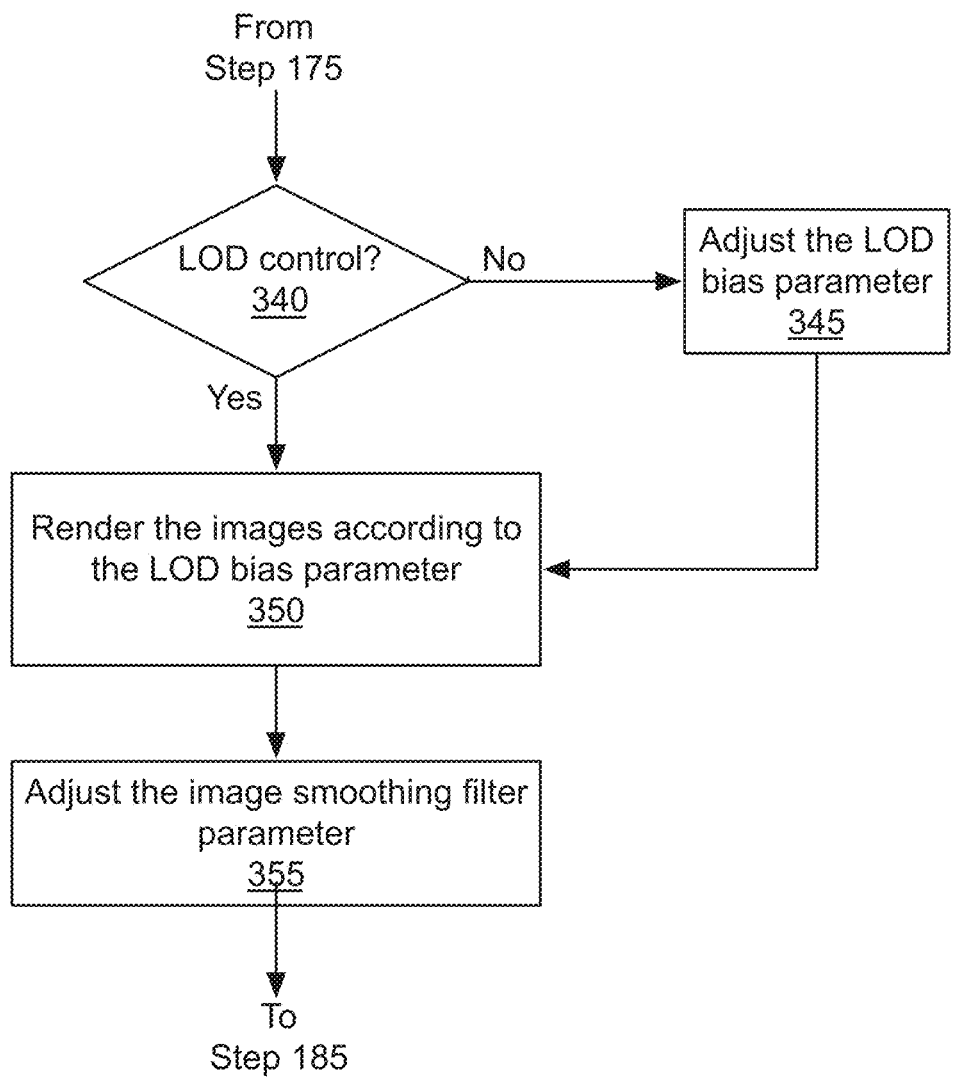
FIG. 3B illustrates a flowchart of a step in the flowchart shown in FIG. 1C that is suitable for use in implementing some embodiments of the present disclosure.

FIG. 3B illustrates a flowchart of the step 180 of the flowchart shown in FIG. 1C that is suitable for use in implementing some embodiments of the present disclosure. At step 340, the image smoothing control 125 determines if the LOD bias used by the game capture unit 105 to render the images can be controlled. If the LOD bias can be controlled, then at step 345, the image smoothing control 125 adjusts the LOD bias parameter that is provided to the game capture unit 105 before proceeding to step 350. Adjusting the LOD bias parameter controls filtering of high spatial frequency texture maps in the rendered images. If the LOD bias cannot be controlled, the image smoothing control 125 proceeds directly to step 350 from step 340. At step 350, the game capture unit 105 renders the images according to the LOD bias. At step 355 the image smoothing control 125 adjusts the parameter that controls filtering that is applied by the image smoothing filter 115 to reduce high spatial frequency content. Reducing the high spatial frequency content reduces the bitrate of the encoded image frames for transfer from the server 110 to the client 140.

Adjusting the bitrate for image transmission from the server 110 to the client 140 using dynamic image smoothing via LOD bias and/or image filtering provides an improved user experience compared with conventional techniques, such as DRC. The bitrate may be quickly increased or decreased in response to changes in the available bandwidth to adapt with a low latency and without causing frame jitter. The dynamic image smoothing does not require resetting the encoder and/or decoder. In an embodiment, the dynamic image smoothing may be implemented as a plug-in for streaming tools so that no modifications are needed for an application to benefit from dynamic image smoothing. The dynamic image smoothing technique provides the end user with an interesting experience even at reduced bitrates by preserving text, heads up display (HUD), and structural detail of the rendered images.

Parallel Processing Architecture

Figure 4:
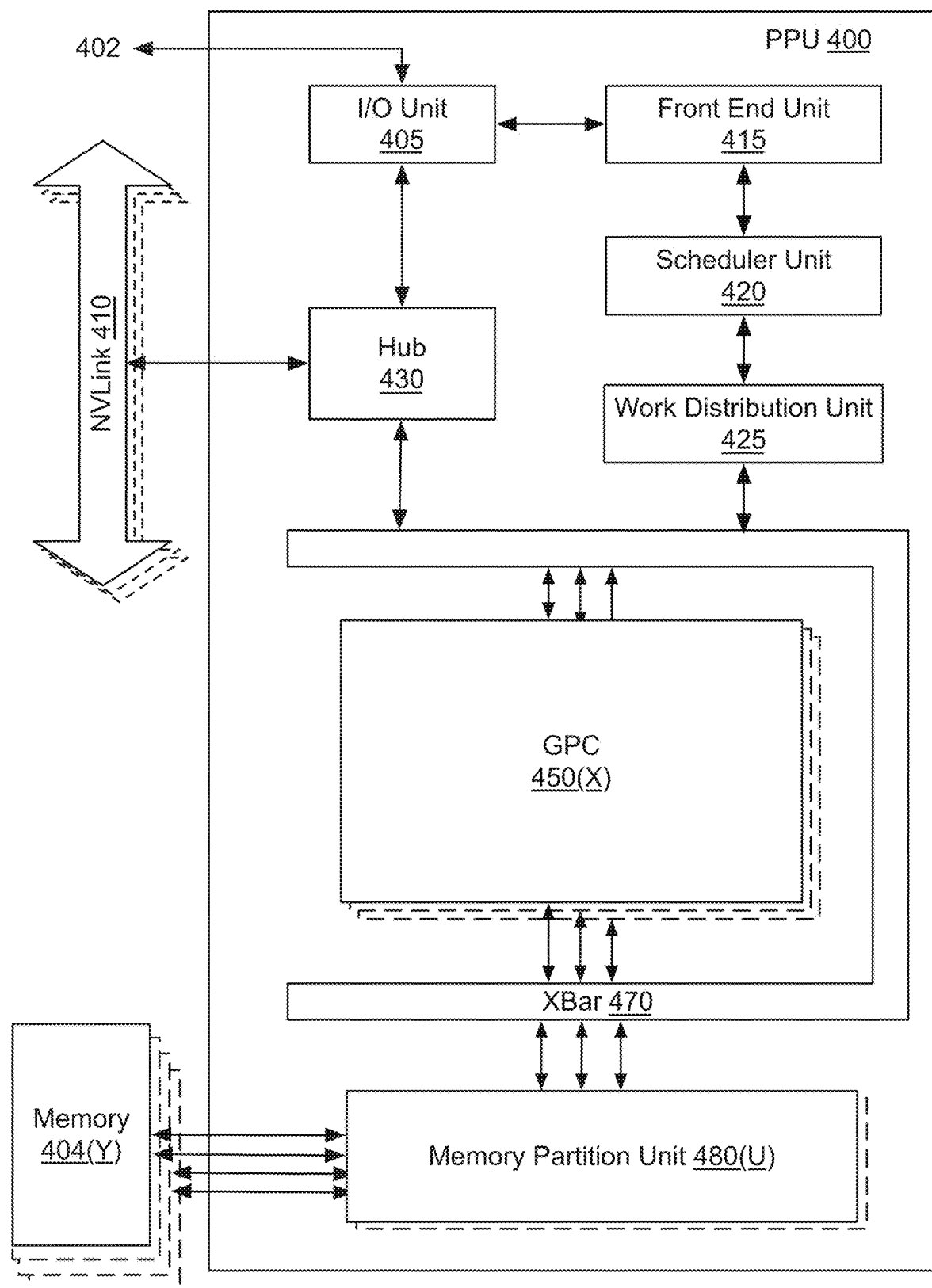
FIG. 4 illustrates an example parallel processing unit suitable for use in implementing some embodiments of the present disclosure.

FIG. 4 illustrates a parallel processing unit (PPU) 400, in accordance with an embodiment. The PPU 400 may be used to implement the server 110 and/or client 140 of the server/client system 100. The PPU 400 may be used to implement one or more of the game capture unit 105, image smoothing filter 115, image smoothing control 125, encoder 120, decoder 130, and network monitor within the server/client system 100.

In an embodiment, the PPU 400 is a multi-threaded processor that is implemented on one or more integrated circuit devices. The PPU 400 is a latency hiding architecture designed to process many threads in parallel. A thread (e.g., a thread of execution) is an instantiation of a set of instructions configured to be executed by the PPU 400. In an embodiment, the PPU 400 is a graphics processing unit (GPU) configured to implement a graphics rendering pipeline for processing three-dimensional (3D) graphics data in order to generate two-dimensional (2D) image data for display on a display device. In other embodiments, the PPU 400 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 400 may be configured to accelerate thousands of High Performance Computing (HPC), data center, cloud computing, and machine learning applications. The PPU 400 may be configured to accelerate numerous deep learning systems and applications for autonomous vehicles, simulation, computational graphics such as ray or path tracing, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 4, the PPU 400 includes an Input/Output (I/O) unit 405, a front end unit 415, a scheduler unit 420, a work distribution unit 425, a hub 430, a crossbar (Xbar) 470, one or more general processing clusters (GPCs) 450, and one or more memory partition units 480. The PPU 400 may be connected to a host processor or other PPUs 400 via one or more high-speed NVLink 410 interconnect. The PPU 400 may be connected to a host processor or other peripheral devices via an interconnect 402. The PPU 400 may also be connected to a local memory 404 comprising a number of memory devices. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 410 interconnect enables systems to scale and include one or more PPUs 400 combined with one or more CPUs, supports cache coherence between the PPUs 400 and CPUs, and CPU mastering. Data and/or commands may be transmitted by the NVLink 410 through the hub 430 to/from other units of the PPU 400 such as one or more copy engines, a video encoder, a video decoder, a power management unit, etc. (not explicitly shown). The NVLink 410 is described in more detail in conjunction with FIG. 5A.

The I/O unit 405 is configured to transmit and receive communications (e.g., commands, data, etc.) from a host processor (not shown) over the interconnect 402. The I/O unit 405 may communicate with the host processor directly via the interconnect 402 or through one or more intermediate devices such as a memory bridge. In an embodiment, the I/O unit 405 may communicate with one or more other processors, such as one or more the PPUs 400 via the interconnect 402. In an embodiment, the I/O unit 405 implements a Peripheral Component Interconnect Express (PCIe) interface for communications over a PCIe bus and the interconnect 402 is a PCIe bus. In alternative embodiments, the I/O unit 405 may implement other types of well-known interfaces for communicating with external devices.

The I/O unit 405 decodes packets received via the interconnect 402. In an embodiment, the packets represent commands configured to cause the PPU 400 to perform various operations. The I/O unit 405 transmits the decoded commands to various other units of the PPU 400 as the commands may specify. For example, some commands may be transmitted to the front end unit 415. Other commands may be transmitted to the hub 430 or other units of the PPU 400 such as one or more copy engines, a video encoder, a video decoder, a power management unit, etc. (not explicitly shown). In other words, the I/O unit 405 is configured to route communications between and among the various logical units of the PPU 400.

In an embodiment, a program executed by the host processor encodes a command stream in a buffer that provides workloads to the PPU 400 for processing. A workload may comprise several instructions and data to be processed by those instructions. The buffer is a region in a memory that is accessible (e.g., read/write) by both the host processor and the PPU 400. For example, the I/O unit 405 may be configured to access the buffer in a system memory connected to the interconnect 402 via memory requests transmitted over the interconnect 402. In an embodiment, the host processor writes the command stream to the buffer and then transmits a pointer to the start of the command stream to the PPU 400. The front end unit 415 receives pointers to one or more command streams. The front end unit 415 manages the one or more streams, reading commands from the streams and forwarding commands to the various units of the PPU 400.

The front end unit 415 is coupled to a scheduler unit 420 that configures the various GPCs 450 to process tasks defined by the one or more streams. The scheduler unit 420 is configured to track state information related to the various tasks managed by the scheduler unit 420. The state may indicate which GPC 450 a task is assigned to, whether the task is active or inactive, a priority level associated with the task, and so forth. The scheduler unit 420 manages the execution of a plurality of tasks on the one or more GPCs 450.

The scheduler unit 420 is coupled to a work distribution unit 425 that is configured to dispatch tasks for execution on the GPCs 450. The work distribution unit 425 may track a number of scheduled tasks received from the scheduler unit 420. In an embodiment, the work distribution unit 425 manages a pending task pool and an active task pool for each of the GPCs 450. As a GPC 450 finishes the execution of a task, that task is evicted from the active task pool for the GPC 450 and one of the other tasks from the pending task pool is selected and scheduled for execution on the GPC 450. If an active task has been idle on the GPC 450, such as while waiting for a data dependency to be resolved, then the active task may be evicted from the GPC 450 and returned to the pending task pool while another task in the pending task pool is selected and scheduled for execution on the GPC 450.

In an embodiment, a host processor executes a driver kernel that implements an application programming interface (API) that enables one or more applications executing on the host processor to schedule operations for execution on the PPU 400. In an embodiment, multiple compute applications are simultaneously executed by the PPU 400 and the PPU 400 provides isolation, quality of service (QoS), and independent address spaces for the multiple compute applications. An application may generate instructions (e.g., API calls) that cause the driver kernel to generate one or more tasks for execution by the PPU 400. The driver kernel outputs tasks to one or more streams being processed by the PPU 400. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. The tasks may be allocated to one or more processing units within a GPC 450 and instructions are scheduled for execution by at least one warp.

The work distribution unit 425 communicates with the one or more GPCs 450 via XBar 470. The XBar 470 is an interconnect network that couples many of the units of the PPU 400 to other units of the PPU 400. For example, the XBar 470 may be configured to couple the work distribution unit 425 to a particular GPC 450. Although not shown explicitly, one or more other units of the PPU 400 may also be connected to the XBar 470 via the hub 430.

The tasks are managed by the scheduler unit 420 and dispatched to a GPC 450 by the work distribution unit 425. The GPC 450 is configured to process the task and generate results. The results may be consumed by other tasks within the GPC 450, routed to a different GPC 450 via the XBar 470, or stored in the memory 404. The results can be written to the memory 404 via the memory partition units 480, which implement a memory interface for reading and writing data to/from the memory 404. The results can be transmitted to another PPU 400 or CPU via the NVLink 410. In an embodiment, the PPU 400 includes a number U of memory partition units 480 that is equal to the number of separate and distinct memory devices of the memory 404 coupled to the PPU 400. Each GPC 450 may include a memory management unit to provide translation of virtual addresses into physical addresses, memory protection, and arbitration of memory requests. In an embodiment, the memory management unit provides one or more translation lookaside buffers (TLBs) for performing translation of virtual addresses into physical addresses in the memory 404.

In an embodiment, the memory partition unit 480 includes a Raster Operations (ROP) unit, a level two (L2) cache, and a memory interface that is coupled to the memory 404. The memory interface may implement 32, 64, 128, 1024-bit data buses, or the like, for high-speed data transfer. The PPU 400 may be connected to up to Y memory devices, such as high bandwidth memory stacks or graphics double-data-rate, version 5, synchronous dynamic random access memory, or other types of persistent storage. In an embodiment, the memory interface implements an HBM2 memory interface and Y equals half U. In an embodiment, the HBM2 memory stacks are located on the same physical package as the PPU 400, providing substantial power and area savings compared with conventional GDDR5 SDRAM systems. In an embodiment, each HBM2 stack includes four memory dies and Y equals 4, with each HBM2 stack including two 128-bit channels per die for a total of 8 channels and a data bus width of 1024 bits.

In an embodiment, the memory 404 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 400 process very large datasets and/or run applications for extended periods.

In an embodiment, the PPU 400 implements a multi-level memory hierarchy. In an embodiment, the memory partition unit 480 supports a unified memory to provide a single unified virtual address space for CPU and PPU 400 memory, enabling data sharing between virtual memory systems. In an embodiment the frequency of accesses by a PPU 400 to memory located on other processors is traced to ensure that memory pages are moved to the physical memory of the PPU 400 that is accessing the pages more frequently. In an embodiment, the NVLink 410 supports address translation services allowing the PPU 400 to directly access a CPU's page tables and providing full access to CPU memory by the PPU 400.

In an embodiment, copy engines transfer data between multiple PPUs 400 or between PPUs 400 and CPUs. The copy engines can generate page faults for addresses that are not mapped into the page tables. The memory partition unit 480 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 404 or other system memory may be fetched by the memory partition unit 480 and stored in the L2 cache 460, which is located on-chip and is shared between the various GPCs 450. As shown, each memory partition unit 480 includes a portion of the L2 cache associated with a corresponding memory 404. Lower level caches may then be implemented in various units within the GPCs 450. For example, each of the processing units within a GPC 450 may implement a level one (L1) cache. The L1 cache is private memory that is dedicated to a particular processing unit. The L2 cache 460 is coupled to the memory interface 470 and the XBar 470 and data from the L2 cache may be fetched and stored in each of the L1 caches for processing.

In an embodiment, the processing units within each GPC 450 implement a SIMD (Single-Instruction, Multiple-Data) architecture where each thread in a group of threads (e.g., a warp) is configured to process a different set of data based on the same set of instructions. All threads in the group of threads execute the same instructions. In another embodiment, the processing unit implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

Each processing unit includes a large number (e.g., 128, etc.) of distinct processing cores (e.g., functional units) that may be fully-pipelined, single-precision, double-precision, and/or mixed precision and include a floating point arithmetic logic unit and an integer arithmetic logic unit. In an embodiment, the floating point arithmetic logic units implement the IEEE 754-2008 standard for floating point arithmetic. In an embodiment, the cores include 64 single-precision (32-bit) floating point cores, 64 integer cores, 32 double-precision (64-bit) floating point cores, and 8 tensor cores.

Tensor cores configured to perform matrix operations. In particular, the tensor cores are configured to perform deep learning matrix arithmetic, such as convolution operations for neural network training and inferencing. In an embodiment, each tensor core operates on a 4×4 matrix and performs a matrix multiply and accumulate operation D=A× B+C, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each processing unit may also comprise M special function units (SFUs) that perform special functions (e.g., attribute evaluation, reciprocal square root, and the like). In an embodiment, the SFUs may include a tree traversal unit configured to traverse a hierarchical tree data structure. In an embodiment, the SFUs may include texture unit configured to perform texture map filtering operations. In an embodiment, the texture units are configured to load texture maps (e.g., a 2D array of texels) from the memory 404 and sample the texture maps to produce sampled texture values for use in shader programs executed by the processing unit. In an embodiment, the texture maps are stored in shared memory that may comprise or include an L1 cache. The texture units implement texture operations such as filtering operations using mip-maps (e.g., texture maps of varying levels of detail). In an embodiment, each processing unit includes two texture units.

Each processing unit also comprises N load store units (LSUs) that implement load and store operations between the shared memory and the register file. Each processing unit includes an interconnect network that connects each of the cores to the register file and the LSU to the register file, shared memory. In an embodiment, the interconnect network is a crossbar that can be configured to connect any of the cores to any of the registers in the register file and connect the LSUs to the register file and memory locations in shared memory.

The shared memory is an array of on-chip memory that allows for data storage and communication between the processing units and between threads within a processing unit. In an embodiment, the shared memory comprises 128 KB of storage capacity and is in the path from each of the processing units to the memory partition unit 480. The shared memory can be used to cache reads and writes. One or more of the shared memory, L1 cache, L2 cache, and memory 404 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory enables the shared memory to function as a high-throughput conduit for streaming data while simultaneously providing high-bandwidth and low-latency access to frequently reused data.

When configured for general purpose parallel computation, a simpler configuration can be used compared with graphics processing. Specifically, fixed function graphics processing units, are bypassed, creating a much simpler programming model. In the general purpose parallel computation configuration, the work distribution unit 425 assigns and distributes blocks of threads directly to the processing units within the GPCs 450. Threads execute the same program, using a unique thread ID in the calculation to ensure each thread generates unique results, using the processing unit(s) to execute the program and perform calculations, shared memory to communicate between threads, and the LSU to read and write global memory through the shared memory and the memory partition unit 480. When configured for general purpose parallel computation, the processing units can also write commands that the scheduler unit 420 can use to launch new work on the processing units.

The PPUs 430 may each include, and/or be configured to perform functions of, one or more processing cores and/or components thereof, such as Tensor Cores (TCs), Tensor Processing Units(TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The PPU 400 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 400 is embodied on a single semiconductor substrate. In another embodiment, the PPU 400 is included in a system-on-a-chip (SoC) along with one or more other devices such as additional PPUs 400, the memory 404, a reduced instruction set computer (RISC) CPU, a memory management unit (MMU), a digital-to-analog converter (DAC), and the like.

In an embodiment, the PPU 400 may be included on a graphics card that includes one or more memory devices. The graphics card may be configured to interface with a PCIe slot on a motherboard of a desktop computer. In yet another embodiment, the PPU 400 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 5A:
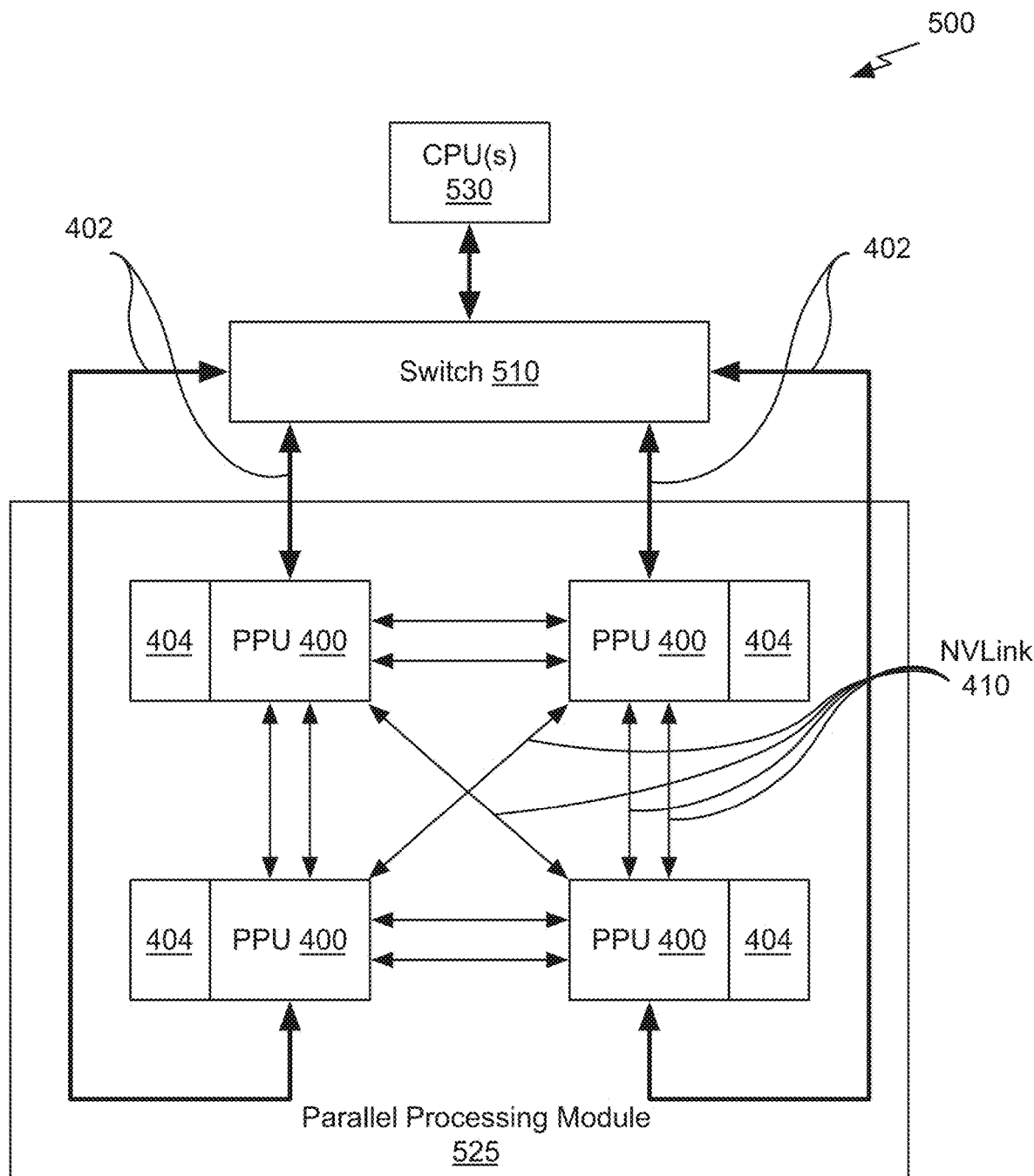
FIG. 5A is a conceptual diagram of a processing system implemented using the PPU of FIG. 4, suitable for use in implementing some embodiments of the present disclosure.

FIG. 5A is a conceptual diagram of a processing system 500 implemented using the PPU 400 of FIG. 4, in accordance with an embodiment. The exemplary system 565 may be configured to implement the method 170, 220, and/or step 185 shown in FIGS. 1C, 2B, and 3B, respectively. The processing system 500 includes a CPU 530, switch 510, and multiple PPUs 400, and respective memories 404.

The NVLink 410 provides high-speed communication links between each of the PPUs 400. Although a particular number of NVLink 410 and interconnect 402 connections are illustrated in FIG. 5A, the number of connections to each PPU 400 and the CPU 530 may vary. The switch 510 interfaces between the interconnect 402 and the CPU 530. The PPUs 400, memories 404, and NVLinks 410 may be situated on a single semiconductor platform to form a parallel processing module 525. In an embodiment, the switch 510 supports two or more protocols to interface between various different connections and/or links.

In another embodiment (not shown), the NVLink 410 provides one or more high-speed communication links between each of the PPUs 400 and the CPU 530 and the switch 510 interfaces between the interconnect 402 and each of the PPUs 400. The PPUs 400, memories 404, and interconnect 402 may be situated on a single semiconductor platform to form a parallel processing module 525. In yet another embodiment (not shown), the interconnect 402 provides one or more communication links between each of the PPUs 400 and the CPU 530 and the switch 510 interfaces between each of the PPUs 400 using the NVLink 410 to provide one or more high-speed communication links between the PPUs 400. In another embodiment (not shown), the NVLink 410 provides one or more high-speed communication links between the PPUs 400 and the CPU 530 through the switch 510. In yet another embodiment (not shown), the interconnect 402 provides one or more communication links between each of the PPUs 400 directly. One or more of the NVLink 410 high-speed communication links may be implemented as a physical NVLink interconnect or either an on-chip or on-die interconnect using the same protocol as the NVLink 410.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 400 and/or memories 404 may be packaged devices. In an embodiment, the CPU 530, switch 510, and the parallel processing module 525 are situated on a single semiconductor platform.

In an embodiment, the signaling rate of each NVLink 410 is 20 to 25 Gigabits/second and each PPU 400 includes six NVLink 410 interfaces (as shown in FIG. 5A, five NVLink 410 interfaces are included for each PPU 400). Each NVLink 410 provides a data transfer rate of 25 Gigabytes/second in each direction, with six links providing 400 Gigabytes/second. The NVLinks 410 can be used exclusively for PPU-to-PPU communication as shown in FIG. 5A, or some combination of PPU-to-PPU and PPU-to-CPU, when the CPU 530 also includes one or more NVLink 410 interfaces.

In an embodiment, the NVLink 410 allows direct load/store/atomic access from the CPU 530 to each PPU's 400 memory 404. In an embodiment, the NVLink 410 supports coherency operations, allowing data read from the memories 404 to be stored in the cache hierarchy of the CPU 530, reducing cache access latency for the CPU 530. In an embodiment, the NVLink 410 includes support for Address Translation Services (ATS), allowing the PPU 400 to directly access page tables within the CPU 530. One or more of the NVLinks 410 may also be configured to operate in a low-power mode.

Figure 5B:
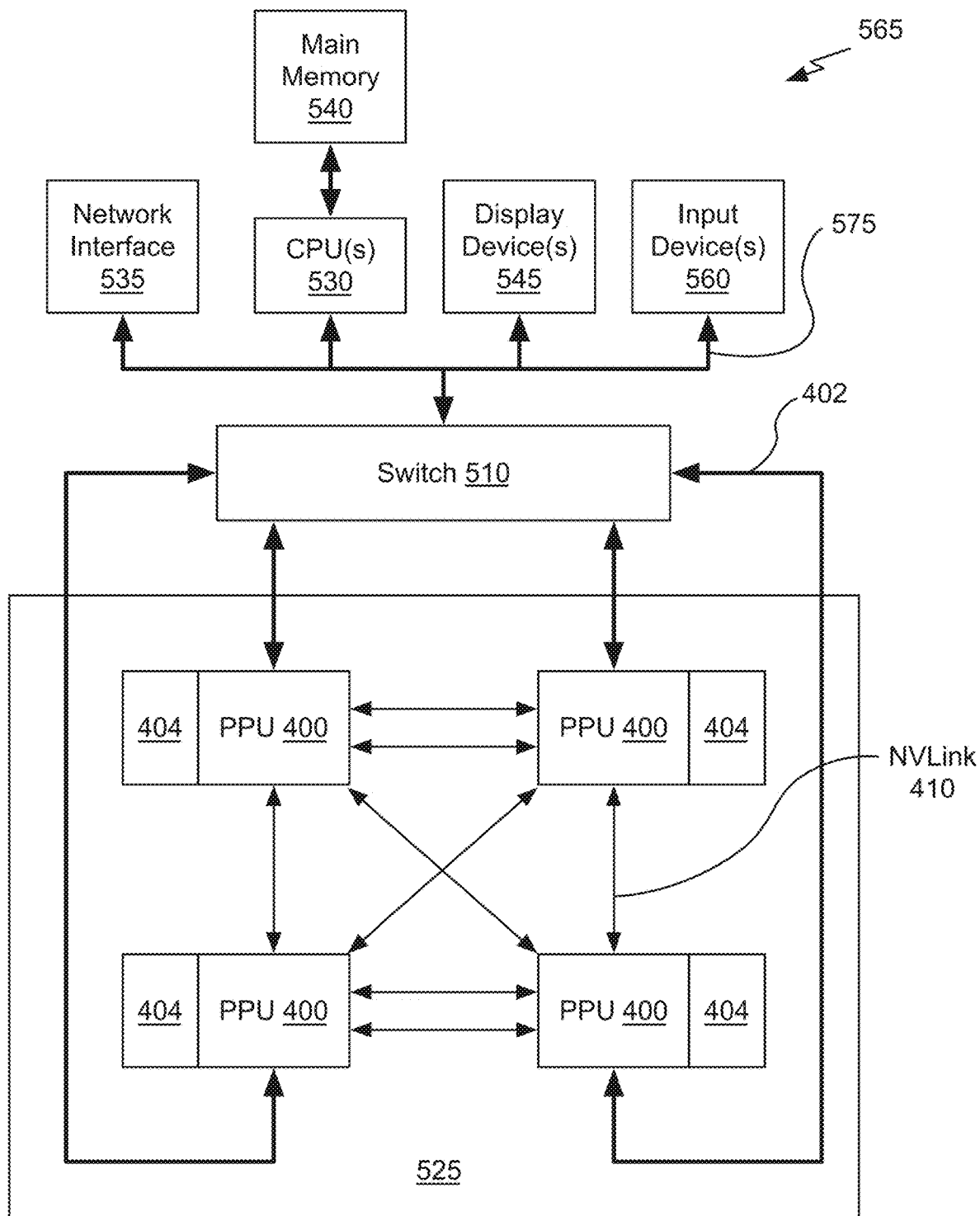
FIG. 5B illustrates an exemplary system in which the various architecture and/or functionality of the various previous embodiments may be implemented.

FIG. 5B illustrates an exemplary system 565 in which the various architecture and/or functionality of the various previous embodiments may be implemented. The exemplary system 565 may be configured to implement the method 170, 220, and/or step 185 shown in FIGS. 1C, 2B, and 3B, respectively.

As shown, a system 565 is provided including at least one central processing unit 530 that is connected to a communication bus 575. The communication bus 575 may directly or indirectly couple one or more of the following devices: main memory 540, network interface 535, CPU(s) 530, display device(s) 545, input device(s) 560, switch 510, and parallel processing system 525. The communication bus 575 may be implemented using any suitable protocol and may represent one or more links or busses, such as an address bus, a data bus, a control bus, or a combination thereof. The communication bus 575 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, HyperTransport, and/or another type of bus or link. In some embodiments, there are direct connections between components. As an example, the CPU(s) 530 may be directly connected to the main memory 540. Further, the CPU(s) 530 may be directly connected to the parallel processing system 525. Where there is direct, or point-to-point connection between components, the communication bus 575 may include a PCIe link to carry out the connection. In these examples, a PCI bus need not be included in the system 565.

Although the various blocks of FIG. 5B are shown as connected via the communication bus 575 with lines, this is not intended to be limiting and is for clarity only. For example, in some embodiments, a presentation component, such as display device(s) 545, may be considered an I/O component, such as input device(s) 560 (e.g., if the display is a touch screen). As another example, the CPU(s) 530 and/or parallel processing system 525 may include memory (e.g., the main memory 540 may be representative of a storage device in addition to the parallel processing system 525, the CPUs 530, and/or other components). In other words, the computing device of FIG. 5B is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 5B.

The system 565 also includes a main memory 540. Control logic (software) and data are stored in the main memory 540 which may take the form of a variety of computer-readable media. The computer-readable media may be any available media that may be accessed by the system 565. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the main memory 540 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by system 565. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

Computer programs, when executed, enable the system 565 to perform various functions. The CPU(s) 530 may be configured to execute at least some of the computer-readable instructions to control one or more components of the system 565 to perform one or more of the methods and/or processes described herein. The CPU(s) 530 may each include one or more cores (e.g., one, two, four, eight, twenty-eight, seventy-two, etc.) that are capable of handling a multitude of software threads simultaneously. The CPU(s) 530 may include any type of processor, and may include different types of processors depending on the type of system 565 implemented (e.g., processors with fewer cores for mobile devices and processors with more cores for servers). For example, depending on the type of system 565, the processor may be an Advanced RISC Machines (ARM) processor implemented using Reduced Instruction Set Computing (RISC) or an x86 processor implemented using Complex Instruction Set Computing (CISC). The system 565 may include one or more CPUs 530 in addition to one or more microprocessors or supplementary co-processors, such as math co-processors.

In addition to or alternatively from the CPU(s) 530, the parallel processing module 525 may be configured to execute at least some of the computer-readable instructions to control one or more components of the system 565 to perform one or more of the methods and/or processes described herein. The parallel processing module 525 may be used by the system 565 to render graphics (e.g., 3D graphics) or perform general purpose computations. For example, the parallel processing module 525 may be used for General-Purpose computing on GPUs (GPGPU). In embodiments, the CPU(s) 530 and/or the parallel processing module 525 may discretely or jointly perform any combination of the methods, processes and/or portions thereof.

The system 565 also includes input device(s) 560, the parallel processing system 525, and display device(s) 545. The display device(s) 545 may include a display (e.g., a monitor, a touch screen, a television screen, a heads-up-display (HUD), other display types, or a combination thereof), speakers, and/or other presentation components. The display device(s) 545 may receive data from other components (e.g., the parallel processing system 525, the CPU(s) 530, etc.), and output the data (e.g., as an image, video, sound, etc.).

The network interface 535 may enable the system 565 to be logically coupled to other devices including the input devices 560, the display device(s) 545, and/or other components, some of which may be built in to (e.g., integrated in) the system 565. Illustrative input devices 560 include a microphone, mouse, keyboard, joystick, game pad, game controller, satellite dish, scanner, printer, wireless device, etc. The input devices 560 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the system 565. The system 565 may be include depth cameras, such as stereoscopic camera systems, infrared camera systems, RGB camera systems, touchscreen technology, and combinations of these, for gesture detection and recognition. Additionally, the system 565 may include accelerometers or gyroscopes (e.g., as part of an inertia measurement unit (IMU)) that enable detection of motion. In some examples, the output of the accelerometers or gyroscopes may be used by the system 565 to render immersive augmented reality or virtual reality.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes. The system 565 may be included within a distributed network and/or cloud computing environment.

The network interface 535 may include one or more receivers, transmitters, and/or transceivers that enable the system 565 to communicate with other computing devices via an electronic communication network, included wired and/or wireless communications. The network interface 535 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The system 565 may also include a secondary storage (not shown). The secondary storage 610 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner. The system 565 may also include a hard-wired power supply, a battery power supply, or a combination thereof (not shown). The power supply may provide power to the system 565 to enable the components of the system 565 to operate.

Each of the foregoing modules and/or devices may even be situated on a single semiconductor platform to form the system 565. Alternately, the various modules may also be situated separately or in various combinations of semiconductor platforms per the desires of the user. While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Machine Learning

Deep neural networks (DNNs) developed on processors, such as the PPU 400 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected nodes (e.g., perceptrons, Boltzmann machines, radial basis functions, convolutional layers, etc.) that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 400. Inferencing is less compute-intensive than training, being a latency-sensitive process where a trained neural network is applied to new inputs it has not seen before to classify images, detect emotions, identify recommendations, recognize and translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 400 is a computing platform capable of delivering performance required for deep neural network-based artificial intelligence and machine learning applications.

Furthermore, images generated applying one or more of the techniques disclosed herein may be used to train, test, or certify DNNs used to recognize objects and environments in the real world. Such images may include scenes of roadways, factories, buildings, urban settings, rural settings, humans, animals, and any other physical object or real-world setting. Such images may be used to train, test, or certify DNNs that are employed in machines or robots to manipulate, handle, or modify physical objects in the real world. Furthermore, such images may be used to train, test, or certify DNNs that are employed in autonomous vehicles to navigate and move the vehicles through the real world. Additionally, images generated applying one or more of the techniques disclosed herein may be used to convey information to users of such machines, robots, and vehicles.

Graphics Processing Pipeline

In an embodiment, the PPU 400 comprises a graphics processing unit (GPU). The PPU 400 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 400 can be configured to process the graphics primitives to generate a frame buffer (e.g., pixel data for each of the pixels of the display).

An application writes model data for a scene (e.g., a collection of vertices and attributes) to a memory such as a system memory or memory 404. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the processing units within the PPU 400 including one or more of a vertex shader, hull shader, domain shader, geometry shader, and a pixel shader. For example, one or more of the processing units may be configured to execute a vertex shader program that processes a number of vertices defined by the model data. In an embodiment, the different processing units may be configured to execute different shader programs concurrently. For example, a first subset of processing units may be configured to execute a vertex shader program while a second subset of processing units may be configured to execute a pixel shader program. The first subset of processing units processes vertex data to produce processed vertex data and writes the processed vertex data to the L2 cache 460 and/or the memory 404. After the processed vertex data is rasterized (e.g., transformed from three-dimensional data into two-dimensional data in screen space) to produce fragment data, the second subset of processing units executes a pixel shader to produce processed fragment data, which is then blended with other processed fragment data and written to the frame buffer in memory 404. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

Figure 6A:
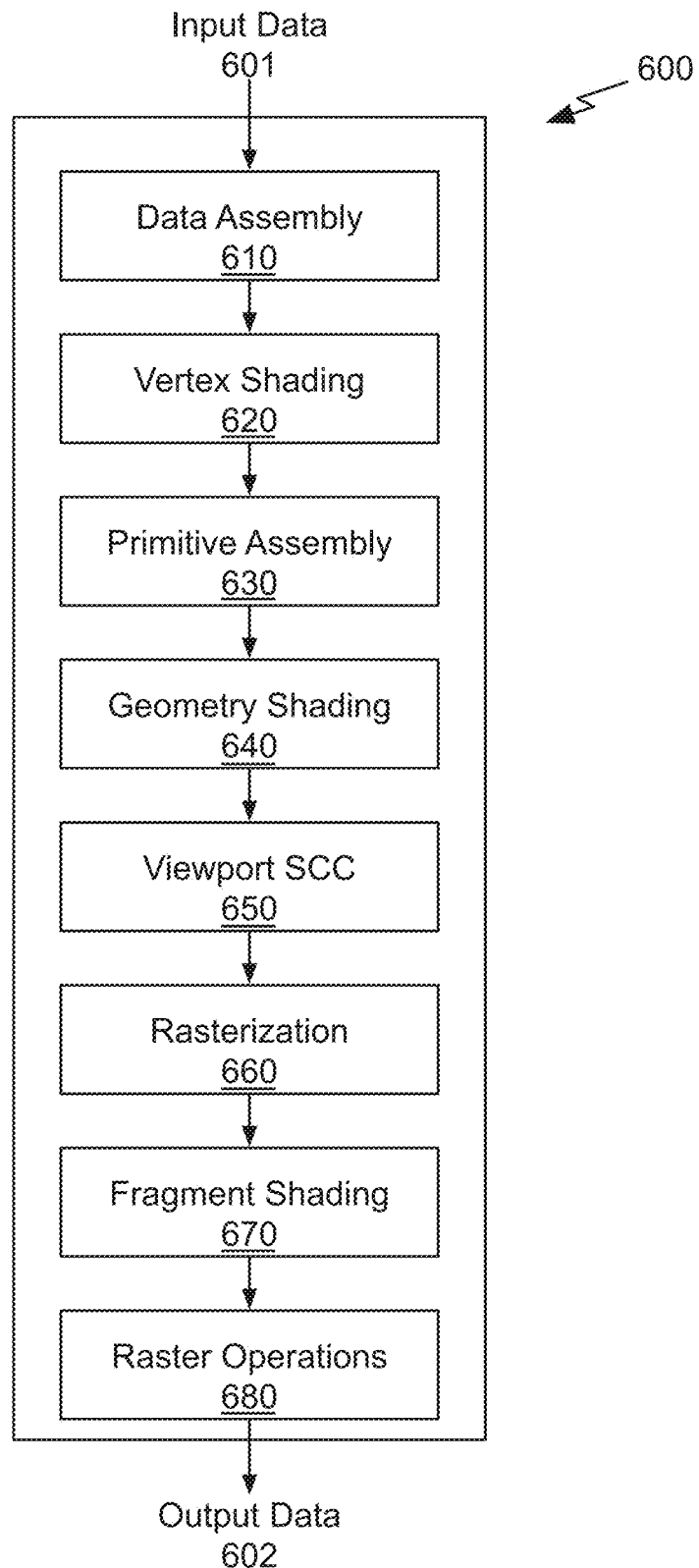
FIG. 6A is a conceptual diagram of a graphics processing pipeline implemented by the PPU of FIG. 4 suitable for use in implementing some embodiments of the present disclosure.

FIG. 6A is a conceptual diagram of a graphics processing pipeline 600 implemented by the PPU 400 of FIG. 4, in accordance with an embodiment. The graphics processing pipeline 600 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 600 receives input data 601 that is transmitted from one stage to the next stage of the graphics processing pipeline 600 to generate output data 602. In an embodiment, the graphics processing pipeline 600 may represent a graphics processing pipeline defined by the OpenGL® API. As an option, the graphics processing pipeline 600 may be implemented in the context of the functionality and architecture of the previous Figures and/or any subsequent Figure(s).

As shown in FIG. 6A, the graphics processing pipeline 600 comprises a pipeline architecture that includes a number of stages. The stages include, but are not limited to, a data assembly stage 610, a vertex shading stage 620, a primitive assembly stage 630, a geometry shading stage 640, a viewport scale, cull, and clip (VSCC) stage 650, a rasterization stage 660, a fragment shading stage 670, and a raster operations stage 680. In an embodiment, the input data 601 comprises commands that configure the processing units to implement the stages of the graphics processing pipeline 600 and geometric primitives (e.g., points, lines, triangles, quads, triangle strips or fans, etc.) to be processed by the stages. The output data 602 may comprise pixel data (e.g., color data) that is copied into a frame buffer or other type of surface data structure in a memory.

The data assembly stage 610 receives the input data 601 that specifies vertex data for high-order surfaces, primitives, or the like. The data assembly stage 610 collects the vertex data in a temporary storage or queue, such as by receiving a command from the host processor that includes a pointer to a buffer in memory and reading the vertex data from the buffer. The vertex data is then transmitted to the vertex shading stage 620 for processing.

The vertex shading stage 620 processes vertex data by performing a set of operations (e.g., a vertex shader or a program) once for each of the vertices. Vertices may be, e.g., specified as a 4-coordinate vector (e.g., <x, y, z, w>) associated with one or more vertex attributes (e.g., color, texture coordinates, surface normal, etc.). The vertex shading stage 620 may manipulate individual vertex attributes such as position, color, texture coordinates, and the like. In other words, the vertex shading stage 620 performs operations on the vertex coordinates or other vertex attributes associated with a vertex. Such operations commonly including lighting operations (e.g., modifying color attributes for a vertex) and transformation operations (e.g., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading stage 620 generates transformed vertex data that is transmitted to the primitive assembly stage 630.

The primitive assembly stage 630 collects vertices output by the vertex shading stage 620 and groups the vertices into geometric primitives for processing by the geometry shading stage 640. For example, the primitive assembly stage 630 may be configured to group every three consecutive vertices as a geometric primitive (e.g., a triangle) for transmission to the geometry shading stage 640. In some embodiments, specific vertices may be reused for consecutive geometric primitives (e.g., two consecutive triangles in a triangle strip may share two vertices). The primitive assembly stage 630 transmits geometric primitives (e.g., a collection of associated vertices) to the geometry shading stage 640.

The geometry shading stage 640 processes geometric primitives by performing a set of operations (e.g., a geometry shader or program) on the geometric primitives. Tessellation operations may generate one or more geometric primitives from each geometric primitive. In other words, the geometry shading stage 640 may subdivide each geometric primitive into a finer mesh of two or more geometric primitives for processing by the rest of the graphics processing pipeline 600. The geometry shading stage 640 transmits geometric primitives to the viewport SCC stage 650.

In an embodiment, the graphics processing pipeline 600 may operate within a streaming multiprocessor and the vertex shading stage 620, the primitive assembly stage 630, the geometry shading stage 640, the fragment shading stage 670, and/or hardware/software associated therewith, may sequentially perform processing operations. Once the sequential processing operations are complete, in an embodiment, the viewport SCC stage 650 may utilize the data. In an embodiment, primitive data processed by one or more of the stages in the graphics processing pipeline 600 may be written to a cache (e.g. L1 cache, a vertex cache, etc.). In this case, in an embodiment, the viewport SCC stage 650 may access the data in the cache. In an embodiment, the viewport SCC stage 650 and the rasterization stage 660 are implemented as fixed function circuitry.

The viewport SCC stage 650 performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (e.g., discarded) because the geometric primitive will not contribute to the final rendered scene. Any geometric primitive that is partially inside the viewing frustum and partially outside the viewing frustum may be clipped (e.g., transformed into a new geometric primitive that is enclosed within the viewing frustum. Furthermore, geometric primitives may each be scaled based on a depth of the viewing frustum. All potentially visible geometric primitives are then transmitted to the rasterization stage 660.

The rasterization stage 660 converts the 3D geometric primitives into 2D fragments (e.g. capable of being utilized for display, etc.). The rasterization stage 660 may be configured to utilize the vertices of the geometric primitives to setup a set of plane equations from which various attributes can be interpolated. The rasterization stage 660 may also compute a coverage mask for a plurality of pixels that indicates whether one or more sample locations for the pixel intercept the geometric primitive. In an embodiment, z-testing may also be performed to determine if the geometric primitive is occluded by other geometric primitives that have already been rasterized. The rasterization stage 660 generates fragment data (e.g., interpolated vertex attributes associated with a particular sample location for each covered pixel) that are transmitted to the fragment shading stage 670.

The fragment shading stage 670 processes fragment data by performing a set of operations (e.g., a fragment shader or a program) on each of the fragments. The fragment shading stage 670 may generate pixel data (e.g., color values) for the fragment such as by performing lighting operations or sampling texture maps using interpolated texture coordinates for the fragment. The fragment shading stage 670 generates pixel data that is transmitted to the raster operations stage 680.

The raster operations stage 680 may perform various operations on the pixel data such as performing alpha tests, stencil tests, and blending the pixel data with other pixel data corresponding to other fragments associated with the pixel. When the raster operations stage 680 has finished processing the pixel data (e.g., the output data 602), the pixel data may be written to a render target such as a frame buffer, a color buffer, or the like.

It will be appreciated that one or more additional stages may be included in the graphics processing pipeline 600 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading stage 640). Other types of graphics processing pipelines are contemplated as being within the scope of the present disclosure. Furthermore, any of the stages of the graphics processing pipeline 600 may be implemented by one or more dedicated hardware units within a graphics processor such as PPU 400. Other stages of the graphics processing pipeline 600 may be implemented by programmable hardware units such as the processing units within the PPU 400.

The graphics processing pipeline 600 may be implemented via an application executed by a host processor, such as a CPU. In an embodiment, a device driver may implement an application programming interface (API) that defines various functions that can be utilized by an application in order to generate graphical data for display. The device driver is a software program that includes a plurality of instructions that control the operation of the PPU 400. The API provides an abstraction for a programmer that lets a programmer utilize specialized graphics hardware, such as the PPU 400, to generate the graphical data without requiring the programmer to utilize the specific instruction set for the PPU 400. The application may include an API call that is routed to the device driver for the PPU 400. The device driver interprets the API call and performs various operations to respond to the API call. In some instances, the device driver may perform operations by executing instructions on the CPU. In other instances, the device driver may perform operations, at least in part, by launching operations on the PPU 400 utilizing an input/output interface between the CPU and the PPU 400. In an embodiment, the device driver is configured to implement the graphics processing pipeline 600 utilizing the hardware of the PPU 400.

Various programs may be executed within the PPU 400 in order to implement the various stages of the graphics processing pipeline 600. For example, the device driver may launch a kernel on the PPU 400 to perform the vertex shading stage 620 on one or more processing units. The device driver (or the initial kernel executed by the PPU 400) may also launch other kernels on the PPU 400 to perform other stages of the graphics processing pipeline 600, such as the geometry shading stage 640 and the fragment shading stage 670. In addition, some of the stages of the graphics processing pipeline 600 may be implemented on fixed unit hardware such as a rasterizer or a data assembler implemented within the PPU 400. It will be appreciated that results from one kernel may be processed by one or more intervening fixed function hardware units before being processed by a subsequent kernel on a processing unit.

Images generated applying one or more of the techniques disclosed herein may be displayed on a monitor or other display device. In some embodiments, the display device may be coupled directly to the system or processor generating or rendering the images. In other embodiments, the display device may be coupled indirectly to the system or processor such as via a network. Examples of such networks include the Internet, mobile telecommunications networks, a WIFI network, as well as any other wired and/or wireless networking system. When the display device is indirectly coupled, the images generated by the system or processor may be streamed over the network to the display device. Such streaming allows, for example, video games or other applications, which render images, to be executed on a server or in a data center and the rendered images to be transmitted and displayed on one or more user devices (such as a computer, video game console, smartphone, other mobile device, etc.) that are physically separate from the server or data center. Hence, the techniques disclosed herein can be applied to enhance the images that are streamed and to enhance services that stream images such as NVIDIA GeForce Now (GFN), Google Stadia, and the like.

Example Game Streaming System

Figure 6B:
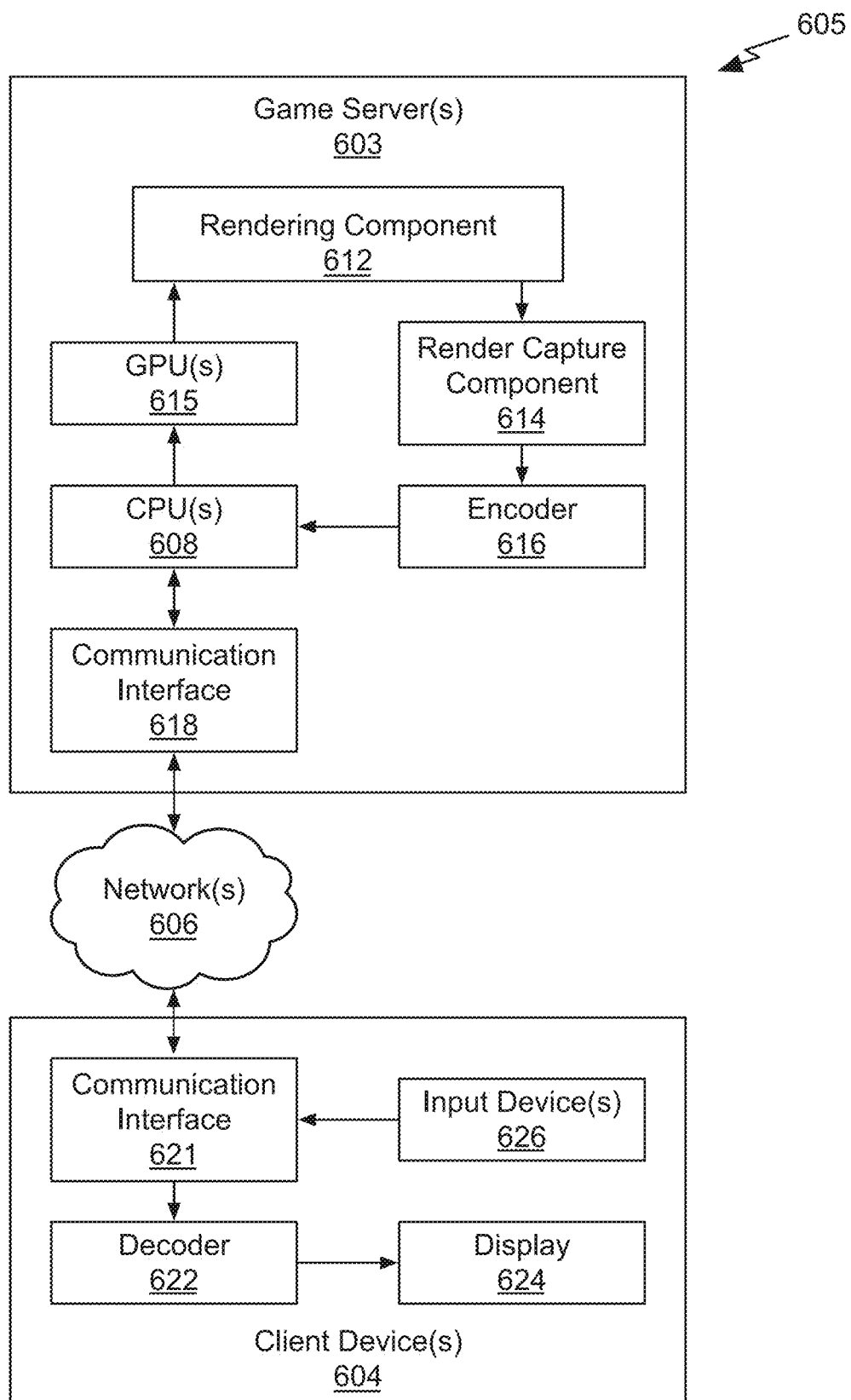
FIG. 6B illustrates an exemplary game streaming system suitable for use in implementing some embodiments of the present disclosure.

FIG. 6B is an example system diagram for a game streaming system 605, in accordance with some embodiments of the present disclosure. The game streaming system 605 may be used in combination with or in place of the server/client system 100 of FIG. 1A. FIG. 6B includes game server(s) 603 (which may include similar components, features, and/or functionality to the example processing system 500 of FIG. 5A and/or exemplary system 565 of FIG. 5B), client device(s) 604 (which may include similar components, features, and/or functionality to the example processing system 500 of FIG. 5A and/or exemplary system 565 of FIG. 5B), and network(s) 606 (which may be similar to the network(s) described herein). In some embodiments of the present disclosure, the system 605 may be implemented.

In the system 605, for a game session, the client device(s) 604 may only receive input data in response to inputs to the input device(s) 626, transmit the input data to the game server(s) 603, receive encoded display data from the game server(s) 603, and display the display data on the display 624. As such, the more computationally intense computing and processing is offloaded to the game server(s) 603 (e.g., rendering—in particular ray or path tracing—for graphical output of the game session is executed by the GPU(s) 615 of the game server(s) 603). In other words, the game session is streamed to the client device(s) 604 from the game server(s) 603, thereby reducing the requirements of the client device(s) 604 for graphics processing and rendering.

For example, with respect to an instantiation of a game session, a client device 604 may be displaying a frame of the game session on the display 624 based on receiving the display data from the game server(s) 603. The client device 604 may receive an input to one of the input device(s) 626 and generate input data in response. The client device 604 may transmit the input data to the game server(s) 603 via the communication interface 621 and over the network(s) 606 (e.g., the Internet), and the game server(s) 603 may receive the input data via the communication interface 618. The CPU(s) 608 may receive the input data, process the input data, and transmit data to the GPU(s) 615 that causes the GPU(s) 615 to generate a rendering of the game session. For example, the input data may be representative of a movement of a character of the user in a game, firing a weapon, reloading, passing a ball, turning a vehicle, etc. The rendering component 612 may render the game session (e.g., representative of the result of the input data) and the render capture component 614 may capture the rendering of the game session as display data (e.g., as image data capturing the rendered frame of the game session). The rendering of the game session may include ray or path-traced lighting and/or shadow effects, computed using one or more parallel processing units—such as GPUs 615, which may further employ the use of one or more dedicated hardware accelerators or processing cores to perform ray or path-tracing techniques of the game server(s) 603.

In an embodiment, the rendering component 612 may be configured to receive an LOD bias parameter that is controlled based on conditions of the network(s) 606. The game server(s) 603 may include an image smoothing control 125 and/or network monitor 135 to adjust the LOD bias parameter and perform dynamic image smoothing to control the bitrate. In an embodiment, the image smoothing filter 115 and image smoothing control 125 is included between the render capture component 614 and the encoder 616.

The encoder 616 may then encode the display data to generate encoded display data and the encoded display data may be transmitted to the client device 604 over the network(s) 606 via the communication interface 618. The client device 604 may receive the encoded display data via the communication interface 621 and the decoder 622 may decode the encoded display data to generate the display data. The client device 604 may then display the display data via the display 624.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the processing system 500 of FIG. 5A and/or exemplary system 565 of FIG. 5B—e.g., each device may include similar components, features, and/or functionality of the processing system 500 and/or exemplary system 565.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example processing system 500 of FIG. 5A and/or exemplary system 565 of FIG. 5B. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

It is noted that the techniques described herein may be embodied in executable instructions stored in a computer readable medium for use by or in connection with a processor-based instruction execution machine, system, apparatus, or device. It will be appreciated by those skilled in the art that, for some embodiments, various types of computer-readable media can be included for storing data. As used herein, a "computer-readable medium" includes one or more of any suitable media for storing the executable instructions of a computer program such that the instruction execution machine, system, apparatus, or device may read (or fetch) the instructions from the computer-readable medium and execute the instructions for carrying out the described embodiments. Suitable storage formats include one or more of an electronic, magnetic, optical, and electromagnetic format. A non-exhaustive list of conventional exemplary computer-readable medium includes: a portable computer diskette; a random-access memory (RAM); a read-only memory (ROM); an erasable programmable read only memory (EPROM); a flash memory device; and optical storage devices, including a portable compact disc (CD), a portable digital video disc (DVD), and the like.

It should be understood that the arrangement of components illustrated in the attached Figures are for illustrative purposes and that other arrangements are possible. For example, one or more of the elements described herein may be realized, in whole or in part, as an electronic hardware component. Other elements may be implemented in software, hardware, or a combination of software and hardware. Moreover, some or all of these other elements may be combined, some may be omitted altogether, and additional components may be added while still achieving the functionality described herein. Thus, the subject matter described herein may be embodied in many different variations, and all such variations are contemplated to be within the scope of the claims.

To facilitate an understanding of the subject matter described herein, many aspects are described in terms of sequences of actions. It will be recognized by those skilled in the art that the various actions may be performed by specialized circuits or circuitry, by program instructions being executed by one or more processors, or by a combination of both. The description herein of any sequence of actions is not intended to imply that the specific order described for performing that sequence must be followed.

All methods described herein may be performed in any suitable order unless otherwise indicated herein or otherwise clearly contradicted by context.

The use of the terms "a" and "an" and "the" and similar references in the context of describing the subject matter (particularly in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. Furthermore, the foregoing description is for the purpose of illustration only, and not for the purpose of limitation, as the scope of protection sought is defined by the claims as set forth hereinafter together with any equivalents thereof. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

What is claimed is:

1. A computer-implemented method, comprising:
    receiving network condition data for a connection from a server to a client;
    in response to a change in the network condition data, automatically adjusting a first parameter and a second parameter;
    rendering one or more images of a scene according to the first parameter that corresponds to a level of detail of a texture map applied to one or more surfaces of the scene; and
    generating one or more image frames according to the second parameter that controls a smoothing filter applied to one or more regions of the one or more rendered images, the one or more regions corresponding to regions with high spatial frequency content, wherein a pixel resolution of the one or more image frames is consistent with a pixel resolution of the one or more rendered images.

2. The computer-implemented method of claim 1, wherein the smoothing filter preserves structural details while modifying the high spatial frequency content.

3. The computer-implemented method of claim 2, wherein the smoothing filter comprises at least one of:
    a rolling guidance filter;
    a bilateral filter; or
    a domain transform filter.

4. The computer-implemented method of claim 1, further comprising encoding the one or more generated image frames for transmission to the client.

5. The computer-implemented method of claim 4, further comprising decoding the encoded one or more generated image frames at the client to produce decoded image frames.

6. The computer-implemented method of claim 5, wherein one of the decoded image frames that is decoded before the change in the network condition data is used as an intra-coded frame (I-frame), wherein at least one of the one or more encoded image frames is decoded based on the I-frame.

7. The computer-implemented method of claim 5, wherein a frame rate of the decoded image frames is constant before and after the change in the network condition data.

8. The computer-implemented method of claim 1, wherein generating the one or more image frames comprises retaining visible geometric structure within the scene.

9. The computer-implemented method of claim 1, wherein the network condition data is monitored by the client.

10. The computer-implemented method of claim 1, wherein the network condition data comprises data relating to at least one of:
    available bandwidth corresponding to the channel;
    a latency corresponding to the channel;
    a jitter corresponding to the channel; or
    a packet loss corresponding to the channel.

11. The computer-implemented method of claim 1, further comprising:
    measuring a bitrate corresponding to the one or more generated image frames; and
    adjusting the second parameter based on a comparison between the bitrate and the network condition data.

12. The computer-implemented method of claim 11, wherein the second parameter is adjusted to increase a level of smoothing to reduce the bitrate.

13. The computer-implemented method of claim 11, wherein the second parameter is adjusted to decrease a level of smoothing to increase the bitrate.

14. The computer-implemented method of claim 1, wherein at least one of the steps of receiving, adjusting, rendering, and generating are performed within a cloud computing environment.

15. The computer-implemented method of claim 1, wherein at least one of the steps of receiving, adjusting, rendering, and generating are performed on the server or in a data center to generate the image frames, and the client comprises a user device.

16. The method of claim 1, wherein the scene is associated with a game program and the first parameter has a higher priority compared with a level of detail determined by the game program.

17. The method of claim 1, wherein at least one of a minimum or a maximum level of the smoothing filter is specified by a user defined control.

18. The method of claim 1, wherein a user defined control specifies a type of filtering performed by the smoothing filter.

19. The computer-implemented method of claim 1, wherein the one or more generated image frames are used for at least one of:
    a gaming application; or
    an application for training, testing, or certifying a neural network employed in a machine, robot, or autonomous vehicle.

20. The computer-implemented method of claim 1, wherein generating the image frames preserves text and structure within the one or more generated image frames.

21. A system, comprising:
    a server comprising a processor and a memory and configured to:
    receive network condition data for a connection from the server to a client;
    in response to a change in the network condition data, automatically adjust a first parameter and a second parameter;

render one or more images of a scene according to the first parameter that corresponds to a level of detail of a texture map applied to one or more surfaces of the scene; and generate one or more image frames according to the second parameter that controls a smoothing filter applied to one or more regions of the one or more rendered images, the one or more regions corresponding to regions with high spatial frequency content, wherein a pixel resolution of the one or more image frames is consistent with a pixel resolution of the one or more rendered images.

22. A non-transitory computer-readable media storing computer instructions that, when executed by one or more processors, cause the one or more processors to perform the steps of:

receiving network condition data for a connection from a server to a client;

in response to a change in the network condition data, automatically adjusting a first parameter and a second parameter;

rendering one or more images of a scene according to the first parameter that corresponds to a level of detail of a texture map applied to one or more surfaces of the scene; and generating one or more image frames according to the second parameter that controls a smoothing filter applied to one or more regions of the one or more rendered images, the one or more regions corresponding to regions with high spatial frequency content, wherein a pixel resolution of the one or more image frames is consistent with a pixel resolution of the one or more rendered images.

* * * * *